US010080147B2

(12) United States Patent
Msallem et al.

(10) Patent No.: US 10,080,147 B2
(45) Date of Patent: Sep. 18, 2018

(54) COMMUNICATION TERMINALS, COMMUNICATION DEVICE, METHODS FOR ESTABLISHING A COMMUNICATION, FOR DETERMINING COMMUNICATION LINKS FOR A COMMUNICATION AND FOR PERFORMING A COMMUNICATION

(71) Applicant: Intel Corporation, Santa Clara, CA (US)

(72) Inventors: Majdi Msallem, Munich (DE); Markus Dominik Mueck, Neubiberg (DE); Christian Drewes, Germering (DE); Ralph Hasholzner, Munich (DE)

(73) Assignee: Intel Corporation, Santa Clara, CA (US)

( * ) Notice: Subject to any disclaimer, the term of this patent is extended or adjusted under 35 U.S.C. 154(b) by 403 days.

(21) Appl. No.: 14/673,904

(22) Filed: Mar. 31, 2015

(65) Prior Publication Data
US 2015/0281981 A1    Oct. 1, 2015

(30) Foreign Application Priority Data

Mar. 31, 2014    (DE) .................. 10 2014 104 538

(51) Int. Cl.
*H04W 72/08* (2009.01)
*H04W 24/02* (2009.01)
(Continued)

(52) U.S. Cl.
CPC ........... *H04W 24/02* (2013.01); *H04W 24/08* (2013.01); *H04W 76/16* (2018.02)

(58) Field of Classification Search
CPC ..... H04W 24/02; H04W 24/08; H04W 76/02; H04W 76/026
See application file for complete search history.

(56) References Cited

U.S. PATENT DOCUMENTS 7,333,512 B2    2/2008    Kumar et al.
2001/0012288 A1    8/2001    Yu
(Continued)

FOREIGN PATENT DOCUMENTS

CN    101132601 A    2/2008
CN    101534573 A    9/2009
WO    2014020560 A1    2/2014

OTHER PUBLICATIONS

Office Action received for corresponding TW Patent Application No. 104105349, dated Jul. 22, 2016, 9 pages and 9pages of English Translation.
(Continued)

*Primary Examiner* — Charles C Jiang
*Assistant Examiner* — Ryan Kavleski
(74) *Attorney, Agent, or Firm* — Viering Jentschura & Partner MBB

(57) ABSTRACT

A communication terminal is described comprising a determiner configured to determine, for each of a plurality of communication networks, a physical link configuration that is available for the communication terminal that provides a maximum throughput to the communication terminal among a number of physical link configurations that is available for the communication terminal and a controller configured to check, for each of the plurality of communication networks, whether a throughput criterion is met when the communication terminal communicates with the communication network with a physical link configuration that provides less than the maximum throughput and to establish a communication link to one or more of the communication networks based on the result of the checking.

18 Claims, 31 Drawing Sheets

(51) Int. Cl.
*H04W 76/16* (2018.01)
*H04W 24/08* (2009.01)

(56) References Cited

U.S. PATENT DOCUMENTS

| | | | |
|---|---|---|---|
| 2004/0009751 | A1 | 1/2004 | Michaelis et al. |
| 2005/0105552 | A1 | 5/2005 | Osterling |
| 2005/0239497 | A1* | 10/2005 | Bahl ............... H04W 88/06 455/552.1 |
| 2009/0180451 | A1 | 7/2009 | Alpert et al. |
| 2011/0075605 | A1* | 3/2011 | De Pasquale ......... H04B 7/022 370/328 |
| 2013/0028069 | A1 | 1/2013 | Pelletier et al. |
| 2013/0083678 | A1 | 4/2013 | Yin |
| 2013/0136067 | A1* | 5/2013 | Praveenkumar .. H04W 28/0231 370/329 |
| 2015/0049825 | A1* | 2/2015 | Salonidis ............. H04B 7/0413 375/267 |
| 2015/0264104 | A1* | 9/2015 | Dunne ................... H04L 47/24 709/224 |

OTHER PUBLICATIONS

Gaie, "Allocation de Ressources a Prise de Decisions Distribuees dans des Reseaux Mobiles Heterogenes", 2009, 110 pages(including English translationpp. 61-109), Universite Paris Sud 11, France.
Shoham et al., "Efficient Bit Allocation for an Arbitrary Set of Quantizers", IEEE Transactions on Acoustics, Speech, and Signal Processing, Sep. 1988, pp. 1445-1453, vol. 36, No. 9.
"LTEOFDM Technology", http://www.tutorialspoint.com/lte/lte_ofdm_technology.htm, 2pages.
"Ruckus on 802.11ac", http://de.slideshare.net/mjarski/80211ac-overview, Apr. 2013, 13 pages.
Li et al., "Nonlinear integer programming", 2006, 233pages, Springer, USA.
Office Action received from German Patent Application 10 2014 104 538.6, dated Aug. 27, 2014 (for reference purposes only).
Chinese Office Action based on application No. 201510252364.3 (11 pages and 19 pages of English translation) dated Feb. 27, 2018 (Reference Purpose Only).

\* cited by examiner

FIG 14

| PHY | Aggregation | Max Bytes (Layer 2) | Max Bytes (Layer 1) |
|---|---|---|---|
| 11b | N (fragmentation often used) | 2,304 | -2,336 |
| 11a/g | N | 2,304 | -2,336 |
| 11n | Y | 7,935 | 65,535 |
| 11ac | Y | 11,454 | 1,048,575 |

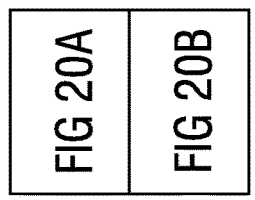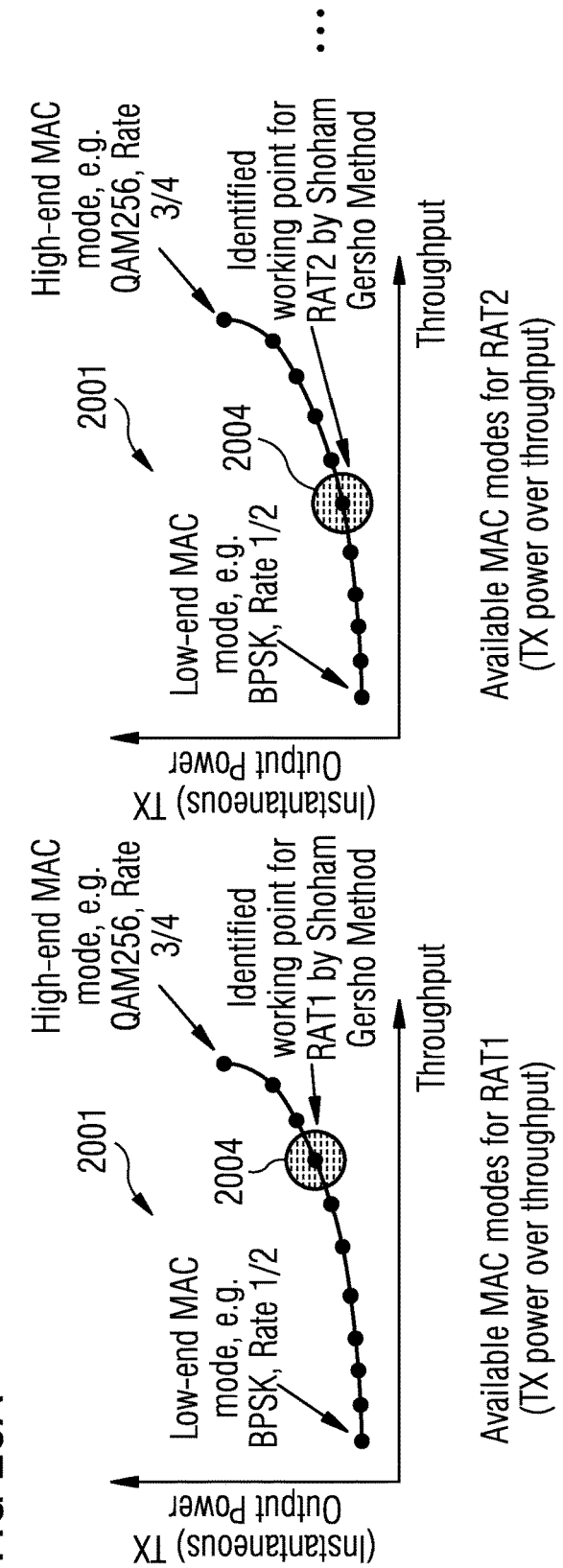

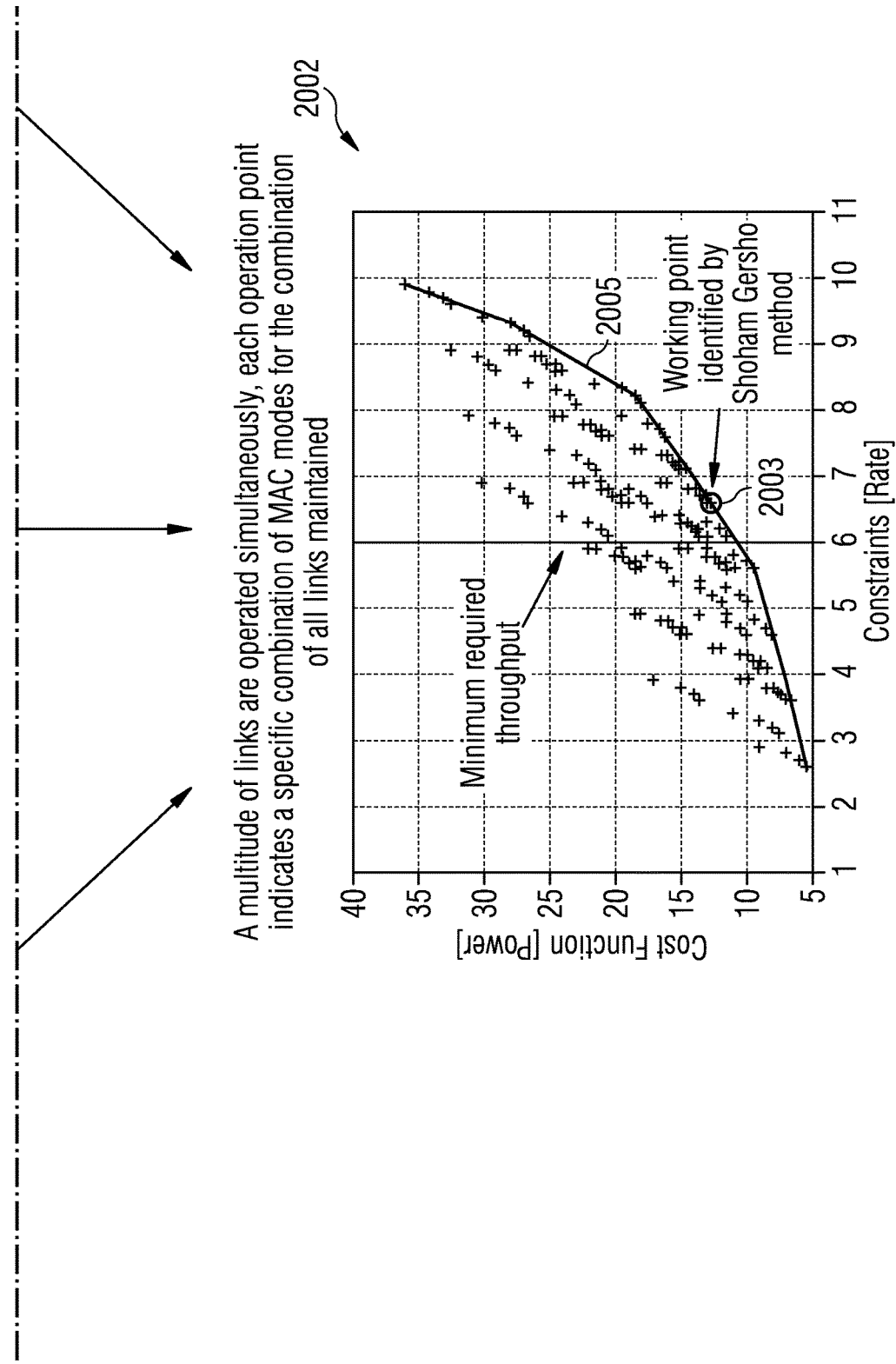

COMMUNICATION TERMINALS, COMMUNICATION DEVICE, METHODS FOR ESTABLISHING A COMMUNICATION, FOR DETERMINING COMMUNICATION LINKS FOR A COMMUNICATION AND FOR PERFORMING A COMMUNICATION

CROSS-REFERENCE TO RELATED APPLICATION

This application claims priority to German Patent Application Serial No. 10 2014 104 538.6, which was filed Mar. 31, 2014, and is incorporated herein by reference in its entirety.

TECHNICAL FIELD

Embodiments described herein generally relate to communication terminals, communication devices, methods for establishing a communication, for determining communication links for a communication and for performing a communication

BACKGROUND

Modern communication terminals may be operated in heterogeneous environments, i.e. in scenarios where a plurality of base stations or access points offer radio access according to different radio access technologies. Since the selection of the communication links that are used for a communication terminal not only has impact on the throughput but also on the power consumption of the communication terminal, efficient methods for selecting communication configurations, e.g. including the number and type of radio links as well as their configuration to be established, are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 14 gives the frame sizes for IEEE.11b, IEEE.11a/g, IEEE.11n and IEEE.11ac.

FIG. 20, comprising FIGS. 20A and 20B, shows throughput-output power diagrams for individual links and a throughput-output power diagram with working points, wherein each working point corresponds to a combination of one or more of the links.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
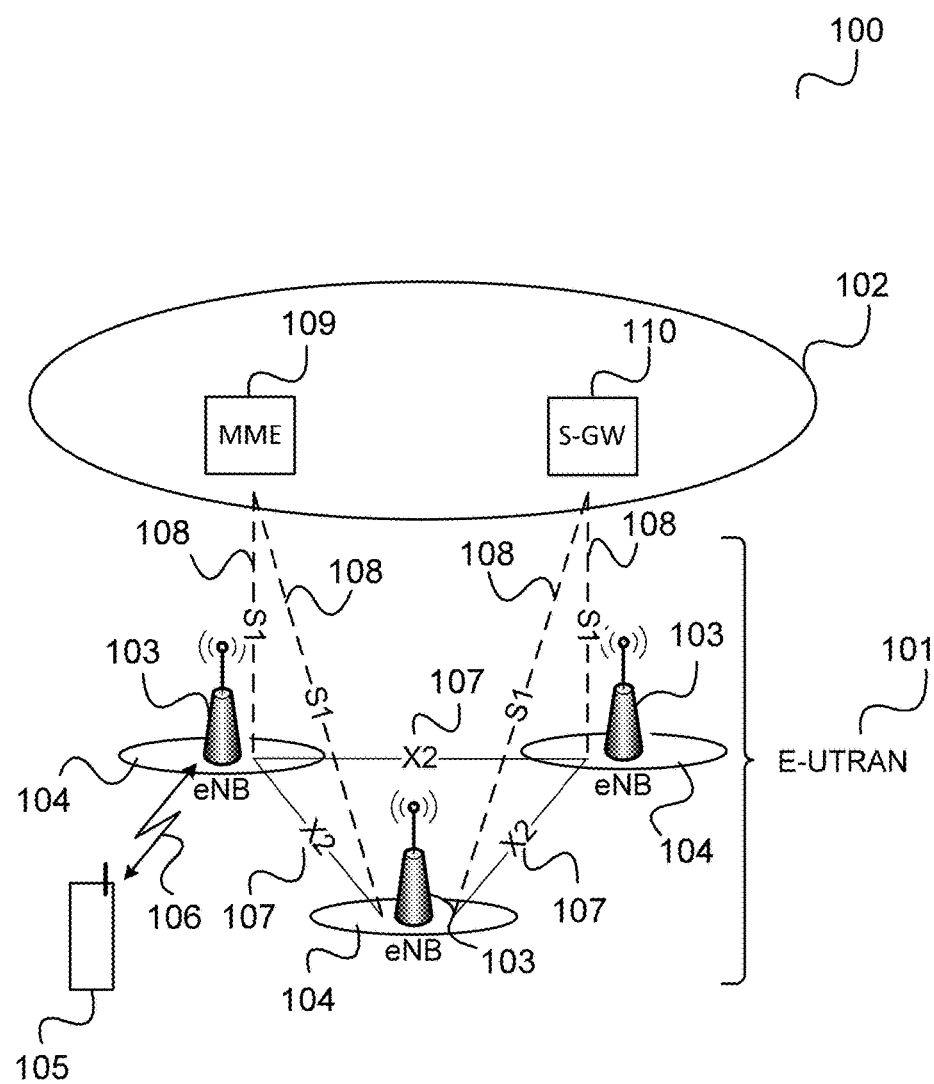
FIG. 1 shows a communication system according to LTE.

FIG. 1 shows a communication system 100.

The communication system 100 may be a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution), or LTE-Advanced) 101 and a core network (e.g. an EPC, Evolved Packet Core, according LTE, or LTE-Advanced) 102. The radio access network 101 may include base stations (e.g. base transceiver stations, eNodeBs, eNBs, home base stations, Home eNodeBs, HeNBs according to LTE, or LTE-Advanced) 103. Each base station 103 may provide radio coverage for one or more mobile radio cells 104 of the radio access network 101. In other words: The base stations 103 of the radio access network 101 may span different types of cells 104 (e.g. macro cells, femto cells, pico cells, small cells, open cells, closed subscriber group cells, hybrid cells, for instance according to LTE, or LTE-Advanced).

A mobile terminal (e.g. UE) 105 located in a mobile radio cell 104 may communicate with the core network 102 and with other mobile terminals 105 via the base station 103 providing coverage in (in other words operating) the mobile radio cell 104. In other words, the base station 103 operating the mobile radio cell 104 in which the mobile terminal 105 is located may provide the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

As used herein, a heterogeneous network may be a cellular network system (e.g., 3GPP system) using multiple different cell types, such as macro, micro, femto, or pico cells. Some or all of the applied cell types may or may not be (partially or fully) overlapping in time, space, or frequency. A heterogeneous network may also be a cellular network combined with other non-cellular technology networks such as WiFi (IEEE 802.11a/b/g/n/ac/ad), WiFi for TVWS (IEEE 802.11af), mmWave systems, or the like. Some or all of the coverage areas or cells of the technologies in the heterogeneous network may or may not be (partially or fully) overlapping in time, space, or frequency.

Wired communications may include serial and parallel wired mediums, such as Ethernet, Universal Serial Bus (USB), Firewire, Digital Visual Interface (DVI), High-Definition Multimedia Interface (HDMI), etc. Wireless communications may include, for example, close-proximity wireless mediums (e.g., Radio Frequency (RF), such as based on the Near Field Communications (NFC) standard, InfraRed (IR), Optical Character Recognition (OCR), magnetic character sensing, or the like), short-range wireless mediums (e.g., Bluetooth, WLAN, Wi-Fi, etc.), long range wireless mediums (e.g., cellular wide area radio communication technology that may include, for example, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g., UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA UMTS (Wideband Code Division Multiple Access Universal Mobile Telecommunications System), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13) and subsequent Releases (such as Rel. 14, Rel. 15, etc.), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard), electronic interaction via sound waves, IEEE 802.11a/b/g/n/ac/ad/af, WiFi, WiFi for TVWS, IEEE 802.16e/m, WiMAX, or the like.

Control and user data may be transmitted between a base station 103 and a mobile terminal 105 located in the mobile radio cell 104 operated by the base station 103 over the air interface 106 on the basis of a multiple access method. On the LTE air interface 106 different duplex methods, such as FDD (Frequency Division Duplex) or TDD (Time Division Duplex), may be deployed.

Modern communication terminals may have communication links to a plurality of communication networks simultaneously. For example, a communication terminal, e.g. a mobile device, may be operated in a heterogeneous wireless context in which the mobile device is able to maintain one or multiple wireless communication links to a multitude of communication networks using different radio access technologies. In the following, it is assumed that a communication terminal may operate a multitude of heterogeneous radio communication links (e.g. communication links according to different radio access technologies can be operated simultaneously). This scenario is illustrated in the FIG. 2.

Figure 2:
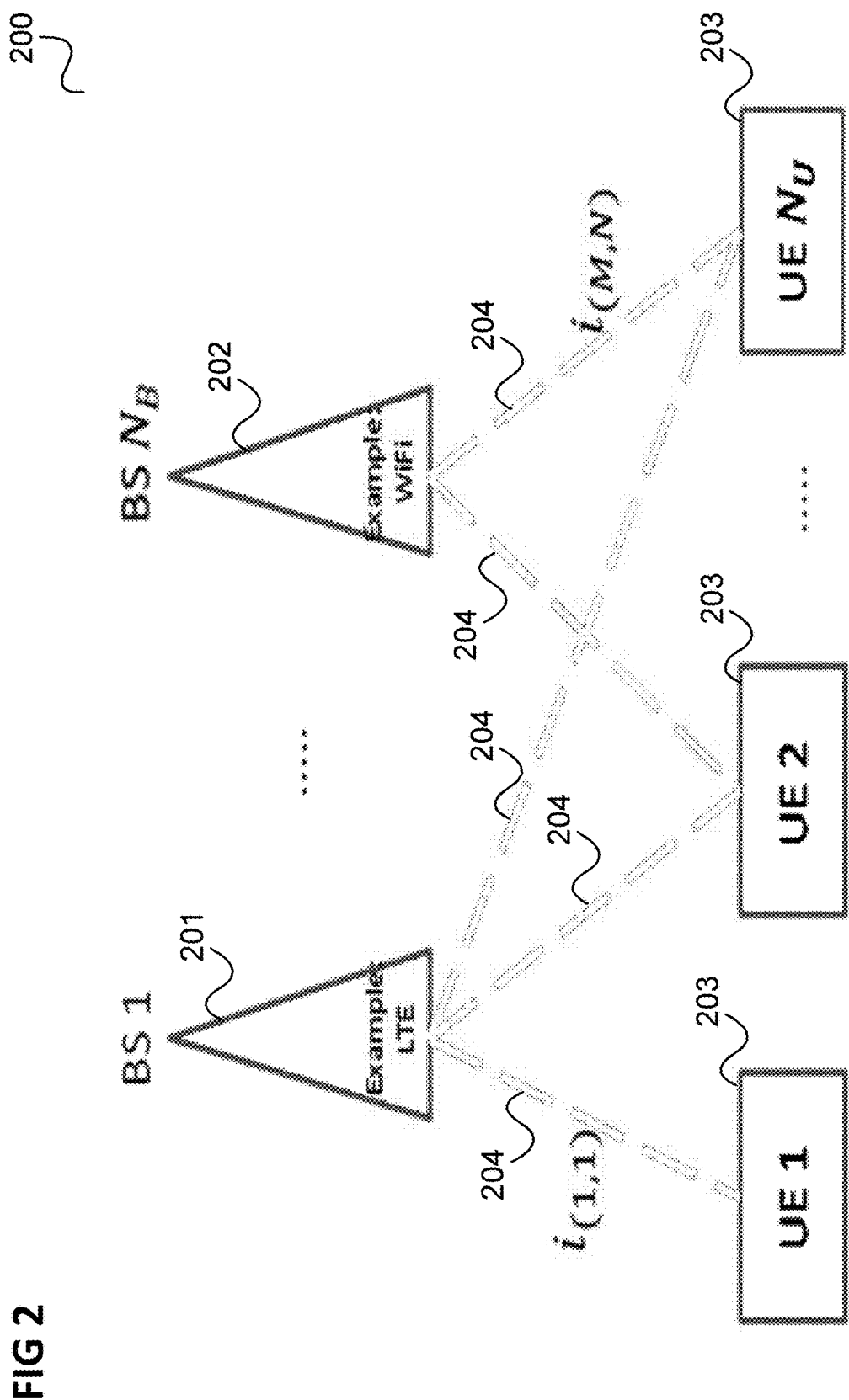
FIG. 2 shows a communication arrangement in a heterogeneous link scenario.

FIG. 2 shows a communication arrangement 200.

The communication arrangement 200 includes a plurality of base stations 201, 202, for example including a first base station operated according to LTE, e.g. corresponding to one of the base stations 103 and an $N_B$th base station (or access point in this case) 202 operated according to WiFi.

Each of a plurality of communication terminals (or mobile devices) 203, e.g. corresponding to communication terminal 105, may have one or more communication links 204 to the base stations 201, 202.

A given mobile device may typically have a target minimum data rate (i.e. a minimum target throughput). In the scenario as illustrated in FIG. 2, it is desirable to identify for a mobile device 203 the optimum number of communication links 204 to be operated simultaneously and the optimum MAC (Medium Access Control) mode for each of the communication links 204.

The term "MAC mode", which may be an example of a component of a physical link configuration, for example refers to a combination of constellation type (e.g. BPSK (binary phase shift keying), QPSK (quadrature phase shift keying), QAM (quadrature amplitude modulation) 16/64/128/256/512/1024/2048/etc.) and a code rate (code rate R=1/2, 2/3, 3/4, etc. including puncturing (i.e. elimination of some bits out of the coded bit stream) and possibly other mechanisms which affect the overall code rate) in combination with MAC mechanisms such as (Hybrid) ARQ or similar.

In other words, the definition of MAC mode in the following for example includes a selected MCS (modulation and coding scheme on the physical layer) with MAC layer retransmission mechanisms and other schemes introducing signaling/retransmission overheads and similar.

The selection of communication links can be performed on the network side or within the mobile device, for example under the following assumptions:

Selection on the network side: the network receives a minimum target data rate from the mobile device as well as a feature list indicating which RATs (Radio Access Technologies) the mobile device can operate simultaneously and under which conditions. The network recommends or enforces a resulting communication configuration (possibly combining a multitude of links, such as for example LTE, WiFi, WiFi for TVWS (TV white spaces, etc.) for the mobile device.

Selection on the mobile device side (terminal side): this may require the introduction of mechanisms into existing (cellular) standards (such as 3GPP LTE or similar). In particular, in this context the mobile device i) selects a target MAC mode (which is traditionally done by the RRM (Radio Resource Management) entities in the network) and ii) determines how many (time/frequency) resources (for example number of resource blocks in the context of LTE or similar) will be allocated to the mobile device when requesting a certain communication link.

In case that the mobile device can operate a multitude of radio links simultaneously, wherein for each communication link a MAC mode among a plurality of available MAC modes is possible, this leads to a large number of operational points (e.g. corresponding to one communication configuration including one or more communication links, each being associated with a MAC mode). This is illustrated in FIG. 3.

Figure 3:
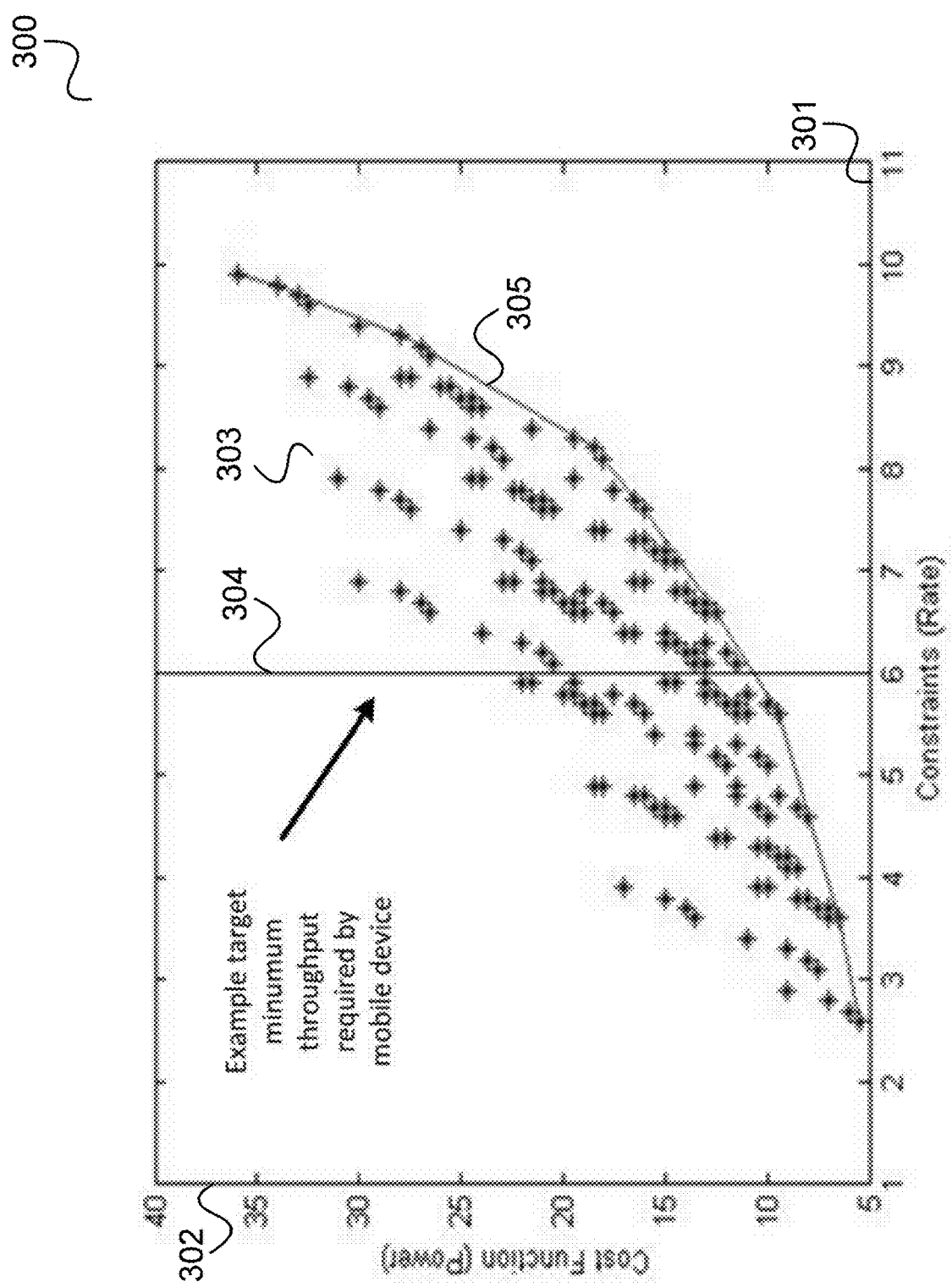
FIG. 3 shows a data rate-transmission power diagram illustrating working points in a heterogeneous link scenario.

FIG. 3 shows a data rate-transmission power diagram 300.

Data rate (i.e. throughput) of a communication configuration increases from left to right along a data rate axis 301 and required transmission power (which can be seen as the cost of a communication configuration) increases from bottom to top along a power axis 302.

A plurality of working points 303 is shown in the diagram 300. Each working point 303 corresponds to a communication configuration and illustrates the instantaneous power consumption versus the resulting data rate. A communication configuration corresponds to any combination of communication links according to all available RATs, each link having one of all available MAC modes available for the corresponding RAT. For example, one working point corresponds to LTE-QPSK-Rate-1/2 operated simultaneously with WiFi-QAM16-Rate-2/3, etc. The cost (required transmission power) of a communication configuration may change and may accordingly be constantly updated, e.g. based on propagation conditions, distance between mobile device and related base stations (including access points). It should be noted that also the mobile device battery state may be included in the cost function.

A line 304 gives an example for a target minimum throughput required by a mobile device. A selection of a communication configuration should thus correspond to a working point that is located to the right of the line 304. Graph 305 illustrates the convex envelope function 305 of the working points 303.

In the following, examples are described with address the selection of a communication configuration for a communication terminal (e.g. a mobile device).

Figure 4:
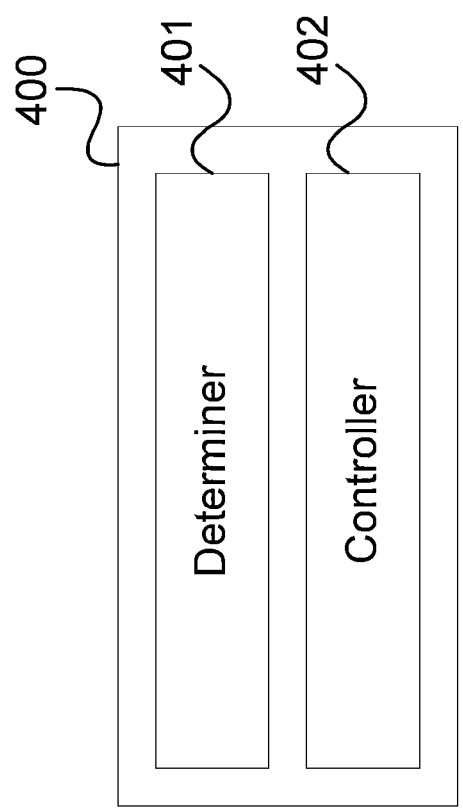
FIG. 4 shows a communication terminal.

FIG. 4 shows a communication terminal 400.

The communication terminal includes a determiner 401 configured to determine, for each of a plurality of communication networks, a physical link configuration that is available for the communication terminal that provides a maximum throughput to the communication terminal among a number of physical link configurations that is available for the communication terminal.

The communication terminal further includes a controller 402 configured to check, for each of the plurality of communication networks, whether a throughput criterion is met when the communication terminal communicates with the communication network with a physical link configuration that provides less than the maximum throughput among the number of physical link configurations that is available for the communication terminal and to establish a communication link to one or more of the communication networks based on the result of the checking.

In other words, for example, a communication terminal checks for the maximum throughput that would be available from each of a plurality of communication networks but may decide that it rather uses less than the maximum throughput for one or more communication networks (and, for example, rather a higher number of communication links, i.e. links to a higher number of the networks), e.g. to save overall transmission power.

Thus, the communication terminal uses a link selection strategy which exploits knowledge on the resources that can be expected to be allocated for the communication terminal for each considered radio access technology (i.e. each network). The communication terminal for example selects a set of radio links (with corresponding physical link configurations) such that its overall output transmission power is minimized.

For this, interactions between a mobile device and network entities may be provided enabling a mobile device centric decision making about the communication configuration. Such interactions (e.g. message flows) may for example be standardization, e.g. in 3GPP or similar.

The communication terminal may take into account the available network resources (e.g. number of resource blocks, number of time slots, bandwidth etc.) per radio link and/or possible network policies which limit the space of the possible decisions within the mobile device.

This may, for the user of a mobile device, lead to a better user experience by longer battery life time and, for the network operator and other user devices, to less interference (for the base stations) because the overall transmission power level may be reduced.

A mobile device may for example select an optimum number of radio links to be operated simultaneously (and select the links among a heterogeneous ensemble of available RATs such as LTE, WiFi, etc.) and the optimum MAC modes for each radio link based on (exact, approximate or estimated) information on how many spectral/time resources would be granted from the respective base station (or access point) to the mobile device. The optimization is for example performed inside the mobile device, e.g. by a component of the mobile device.

For this, as described below, a computationally efficient optimization algorithm may be used and mechanisms may be provided for obtaining information about the amount of spectral/time resources (or generally the physical link configurations) available for the mobile device. For example, based on corresponding estimates, the mobile device can select the optimum RATs to be operated simultaneously and the corresponding MAC modes (or more generally the physical link configurations).

Corresponding decision making on the network side can typically not react to fast requirement changes in the mobile device and do typically not meet the exact requirements of each mobile device. This may lead to a poorer working point and a higher power consumption and faster battery drain for the mobile device.

Figure 5:
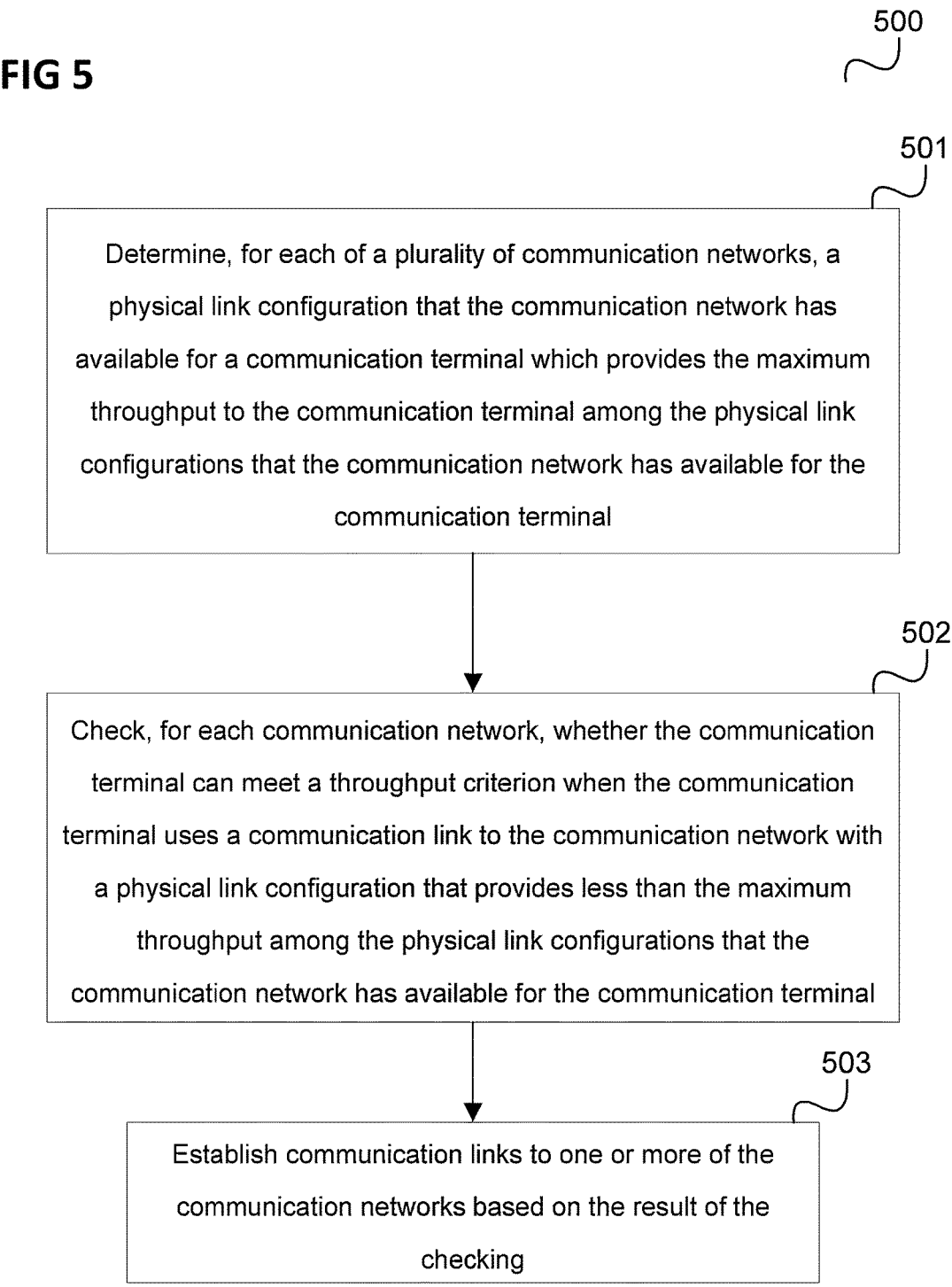
FIG. 5 shows a flow diagram illustrating a method for establishing a communication.

The communication terminal 400 for example carries out a method as illustrated in FIG. 5.

FIG. 5 shows a flow diagram 500.

The flow diagram 500 illustrates a method for establishing a communication, for example carried out by a communication terminal.

In 501, the communication terminal determines, for each of a plurality of communication networks, a physical link configuration that is available for the communication terminal that provides a maximum throughput to the communication terminal among a number of physical link configurations that is available for the communication terminal.

In 502, the communication checks, for each of the plurality of communication networks, whether a throughput criterion is met when the communication terminal communicates with the communication network with a physical link configuration that provides less than the maximum throughput among the number of physical link configurations that is available for the communication terminal.

In 503, the communication terminal establishes communication links to one or more of the communication networks based on the result of the checking.

Figure 6:
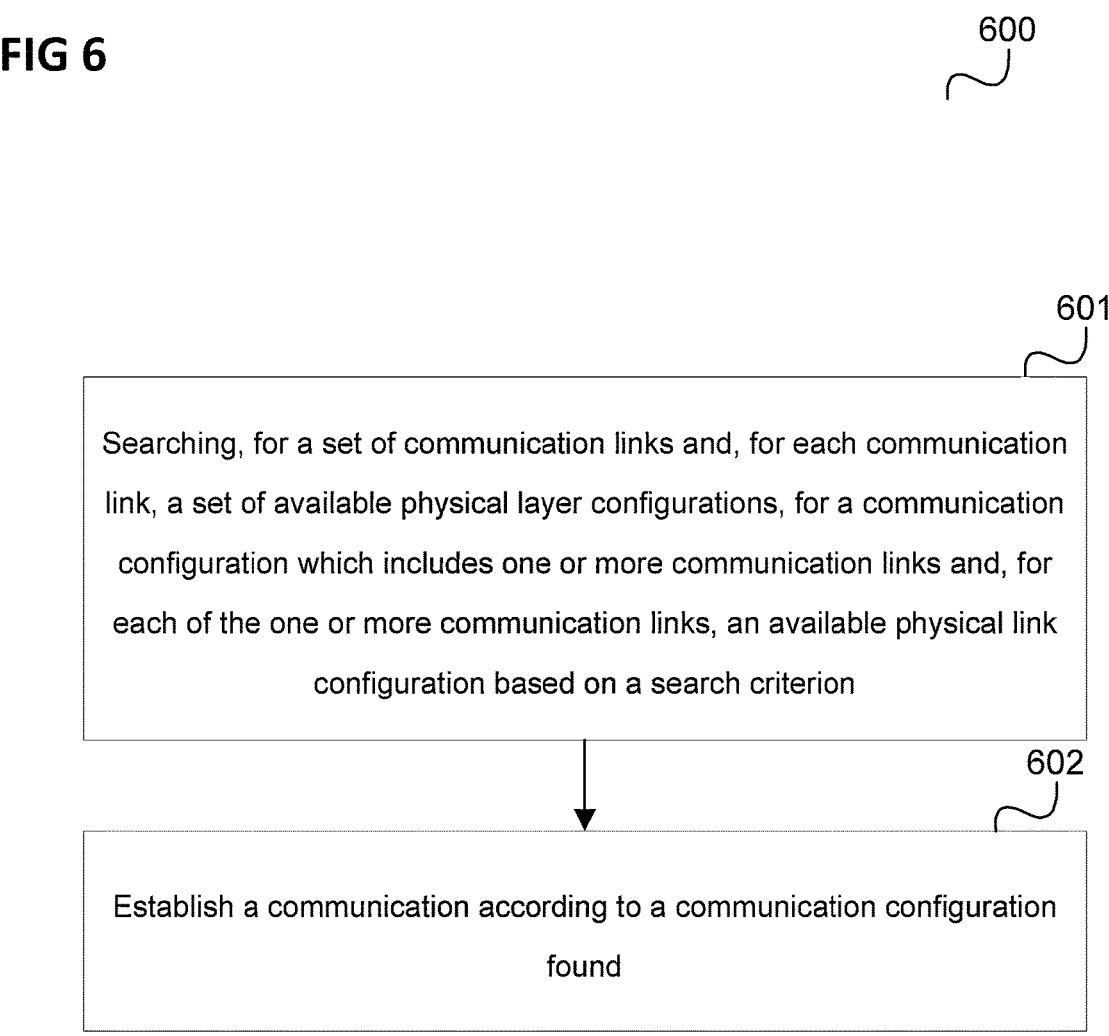
FIG. 6 shows a flow diagram illustrating a method for determining communication links for a communication.

A further example is illustrated in FIG. 6.

FIG. 6 shows a flow diagram 600.

The flow diagram 600 illustrates a method for determining communication links for a communication, for example carried out by a communication device (e.g. a communication terminal or a communication network component such as a base station).

In 601, the communication device searches, for a set of communication links and, for each communication link, a set of available physical layer configurations, for a communication configuration which includes one or more communication links and, for each of the one or more communication links, an available physical link configuration based on a search criterion.

In 602, the communication device establishes a communication according to a communication configuration found.

In other words, a search for a communication configuration, e.g. in a heterogeneous network scenario is performed.

For example, as described in more detail below, a communication configuration that has been found in a search for communication configurations is eliminated from the further search by excluding at least one component of the communication configuration, namely (at least) the physical link configuration (e.g. including the MAC mode) of one of the communication links included in the communication configuration.

Thus, the search may continue and a better communication configuration (in terms of cost such as transmission power) may be found.

For example, there exist discrete, convex optimization mechanisms where the search space (or solution space) is restricted, such as a convex envelope function of working points such as illustrated by graph 305. This inherent sub-optimality may be overcome by eliminating a communication configuration found (which is for example optimal for the restricted search space) and continuing the search without this communication configuration. In other words, sub-optimalities of solutions found in convex envelope search algorithms can be avoided by iteratively eliminating found and continuing the search algorithm. Thus, the sub-optimality of the search algorithm may be avoided while keeping the efficiency of the search algorithm.

This allows efficient link selection (including number of radio links to be operated simultaneously and optimum MAC modes for each radio link).

The selection of the target optimization technique and the selection of the number of iterations may depend on mobile device constraints (such as maximum number of radio links to be operated simultaneously, etc.).

An efficient link selection may, for the user of a mobile device, lead to a better user experience by longer battery life time and, for the network operator and other user devices, to less interference (for the base stations) because the overall transmission power level may be reduced.

For example, the optimum mobile device link configuration in a multi-link context (i.e., multiple radio access technologies are maintained simultaneously and the mobile device is assumed to be able to choose the target MAC modes directly or indirectly) may be identified. The optimization is for example performed inside the mobile device.

Figure 7:
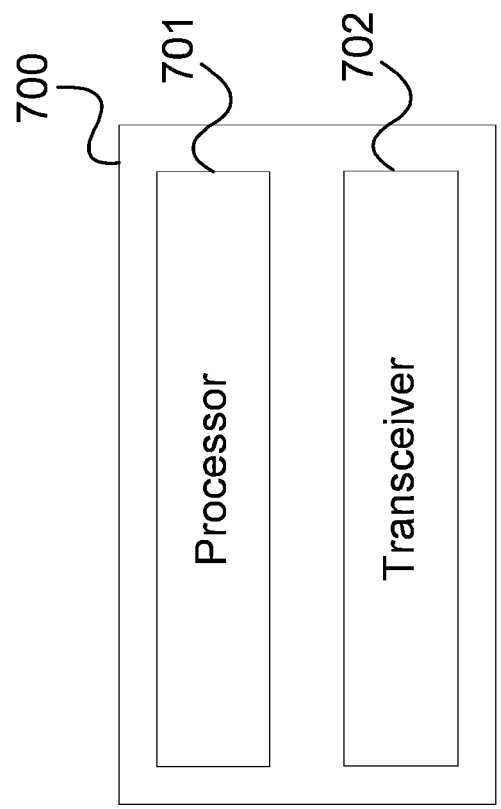
FIG. 7 shows a communication device.

The method illustrated in FIG. 6 is for example carried out by a communication device (e.g. a communication terminal or a network component) as illustrated in FIG. 7.

FIG. 7 shows a communication device 700.

The communication device 700 includes: a processor 701 configured to search, for a set of communication links and, for each communication link, a set of available physical layer configurations, for a communication configuration which includes one or more communication links and, for each of the one or more communication links, an available physical link configuration based on a search criterion.

The communication device 700 further includes a transceiver 702 configured to establish a communication according to a communication configuration found.

Figure 8:
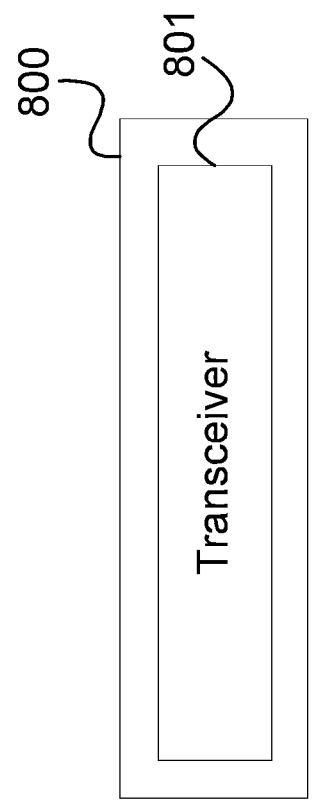
FIG. 8 shows a communication terminal.

A further example is illustrated in FIG. 8.

FIG. 8 shows a communication terminal 800.

The communication terminal 800 includes a transceiver 801 configured to perform a communication alternately using a first communication configuration having a first throughput and a second communication configuration having a second throughput such that the average throughput of the communication meets a predetermined throughput criterion.

In other words, a communication terminal switches between two (or more) combinations of communication links (including at least one communication link) with different throughput such that in average, the communication has a desired throughput. For example, a time sharing approach may be used for combining different RAT selection ensembles, i.e. communication configurations including communication links of various RATs. This allows a mobile device to exactly meet its minimum throughput requirement while minimizing the overall mobile device output power.

For example, for meeting the minimum throughput requirement by time sharing between two communication configurations, the mobile terminal chooses a first communication configuration with a throughput above the minimum throughput requirement and a second communication configuration with a throughput below the minimum throughput requirement.

The communication configurations may also differ in terms of carrier aggregation, e.g. one using carrier aggregation or a stronger form of carrier aggregation (and thus offering a higher throughput) and the other not using carrier aggregation or a weaker form of carrier aggregation (and thus providing a lower throughput).

The time sharing of communication configurations may, for the user of a mobile device, lead to a better user experience by longer battery life time and, for the network operator and other user devices, to less interference (for the base stations) because the overall transmission power level may be reduced.

For determining the communication configurations with suitable throughputs a computationally efficient optimization algorithm may be used, as described below and for example according to the approach described with reference to FIG. 6.

The communication configurations are for example wireless link working points as illustrated in FIG. 3, each working point corresponding to a number of wireless links being operated simultaneously, at a given MAC mode, with a given number of spectral/time resources.

Figure 9:
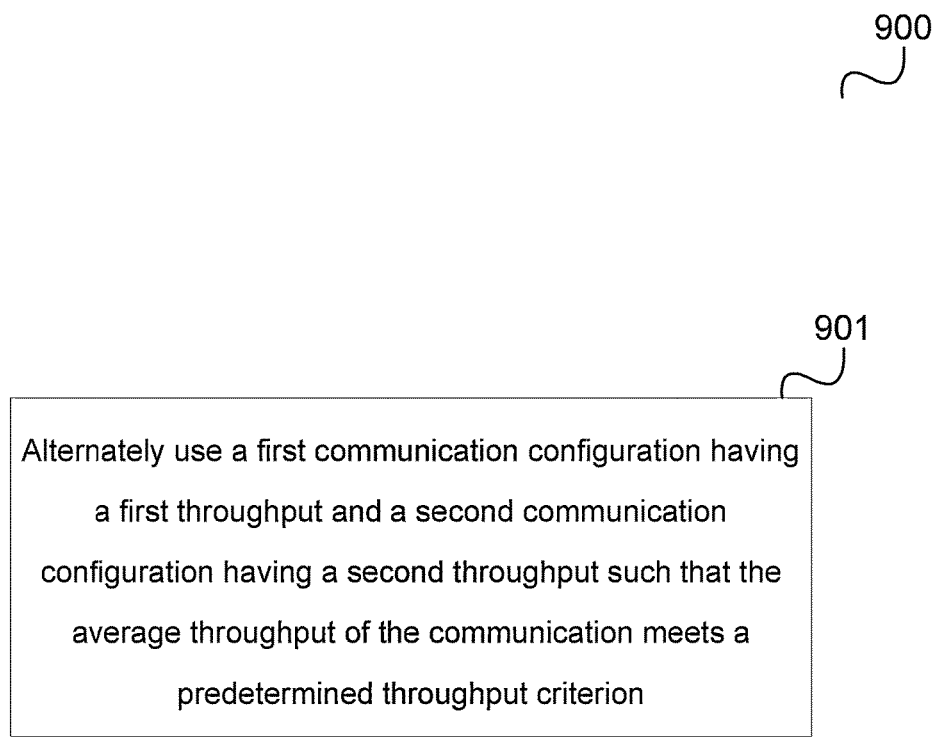
FIG. 9 shows a flow diagram illustrating a method for performing a communication.

The communication terminal for example carries out a method as illustrated in FIG. 9.

FIG. 9 shows a flow diagram 900.

The flow diagram 900 illustrates a method for performing a communication, for example performed by a communication terminal.

In 901 the communication terminal alternately uses a first communication configuration having a first throughput and a second communication configuration having a second throughput such that the average throughput of the communication meets a predetermined throughput criterion.

It should be noted that the components of the various communication terminals and devices may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

The following examples pertain to further embodiments.

Example 1 is a communication terminal as illustrated in FIG. 4.

In Example 2, the subject matter of Example 1 can optionally include the controller being configured to establish, for at least one of the communication networks, a communication link to the communication network with a physical link configuration that is less than the maximum throughput among the number of physical link configurations that is available for the communication terminal if the communication terminal meets the throughput criterion when the communication terminal communicates with the communication network with the physical link configuration.

In Example 3, the subject matter of any one of Examples 1-2 can optionally include the controller being configured to select one or more communication links to one or more of the communication networks and, for each of the one or more communication links, a physical link configuration, based on the result of the checking and being configured to establish the selected one or more communication links with the selected physical link configurations.

In Example 4, the subject matter of Examples 3 can optionally include the controller being configured to request, for each of the one or more selected communication links, establishment of the communication link with the selected physical link configuration from the respective communication network.

In Example 5, the subject matter of any one of Examples 3-4 can optionally include the controller being configured to select the one or more communication links based on a criterion for reducing the required transmission power operating the one or more communication links.

In Example 6, the subject matter of any one of Examples 3-5 can optionally include the controller being configured to select the one or more communication links based on a criterion for maximizing the frequency spectrum provided by the one or more communication links.

In Example 7, the subject matter of any one of Examples 3-6 can optionally include the controller being configured to select the one or more communication links based on a criterion for maximizing the transmission power efficiency provided by the one or more communication links.

In Example 8, the subject matter of any one of Examples 1-7 can optionally include the controller being configured to search, for the communication networks and, for each of the plurality of communication networks, a set of available physical layer configurations for a communication link to the communication network, a communication configuration which includes a set of communication links and, for each communication link, a physical link configuration.

In Example 9, the subject matter of Example 8 can optionally include the controller being configured to determine information about available communication networks based on at least one of a search performed by the communication terminal, a database query and information provided by another communication terminal.

In Example 10, the subject matter of any one of Examples 1-9 can optionally include the physical link configuration of a communication link including an amount of communication resources used for the communication link.

In Example 11, the subject matter of any one of Examples 1-10 can optionally include the physical link configuration of a communication link including a modulation and coding scheme used for the communication link.

In Example 12, the subject matter of any one of Examples 1-11 can optionally include the physical link configuration of a communication link including a code rate used for the communication link.

In Example 13, the subject matter of any one of Examples 1-12 can optionally include the physical link configuration of a communication link including a constellation type used for the communication link.

In Example 14, the subject matter of any one of Examples 1-13 can optionally include the physical link configuration of a communication link including a MAC mode used for the communication link.

In Example 15, the subject matter of any one of Examples 1-14 can optionally include the determiner being configured to request, for at least one of the communication networks, information about the physical link configuration which offers the maximum throughput to the communication terminal from the communication network.

In Example 16, the subject matter of any one of Examples 1-15 can optionally include the determiner being configured to request, for at least one of the communication networks, information about physical link configurations that is available for the communication terminal.

In Example 17, the subject matter of any one of Examples 1-16 can optionally include the determiner being configured to request, for at least one of the communication networks, information about all physical link configurations that are available for the communication terminal.

In Example 18, the subject matter of any one of Examples 1-17 can optionally include the communication networks operating at least partially according to different radio access technologies.

Example 19 is a method for establishing a communication as illustrated in FIG. 5.

In Example 20, the subject matter of Example 19 can optionally include establishing, for at least one of the communication networks, a communication link to the communication network with a physical link configuration that is less than the maximum throughput among the number of physical link configurations that is available for the communication terminal if the communication terminal meets the throughput criterion when the communication terminal communicates with the communication network with the physical link configuration.

In Example 21, the subject matter of any one of Examples 19-20 can optionally include selecting one or more communication links to one or more of the communication networks and, for each of the one or more communication links, a physical link configuration, based on the result of the checking establishing the selected one or more communication links with the selected physical link configurations.

In Example 22, the subject matter of Examples 21 can optionally include requesting, for each of the one or more selected communication links, establishment of the communication link with the selected physical link configuration from the respective communication network.

In Example 23, the subject matter of any one of Examples 21-22 can optionally include selecting the one or more communication links based on a criterion for reducing the required transmission power operating the one or more communication links.

In Example 24, the subject matter of any one of Examples 21-23 can optionally include selecting the one or more communication links based on a criterion for maximizing the frequency spectrum provided by the one or more communication links.

In Example 25, the subject matter of any one of Examples 21-24 can optionally include selecting the one or more communication links based on a criterion for maximizing the transmission power efficiency provided by the one or more communication links.

In Example 26, the subject matter of any one of Examples 19-25 can optionally include searching, for the communication networks and, for each of the plurality of communication networks, a set of available physical layer configurations for a communication link to the communication network, a communication configuration which includes a set of communication links and, for each communication link, a physical link configuration.

In Example 27, the subject matter of Example 26 can optionally include determining information about available communication networks based on at least one of a search performed by the communication terminal, a database query and information provided by another communication terminal.

In Example 28, the subject matter of any one of Examples 19-27 can optionally include the physical link configuration of a communication link including an amount of communication resources used for the communication link.

In Example 29, the subject matter of any one of Examples 19-28 can optionally include the physical link configuration of a communication link including a modulation and coding scheme used for the communication link.

In Example 30, the subject matter of any one of Examples 19-29 can optionally include the physical link configuration of a communication link including a code rate used for the communication link.

In Example 31, the subject matter of any one of Examples 19-30 can optionally include the physical link configuration of a communication link including a constellation type used for the communication link.

In Example 32, the subject matter of any one of Examples 19-31 can optionally include the physical link configuration of a communication link including a MAC mode used for the communication link.

In Example 33, the subject matter of any one of Examples 19-32 can optionally include requesting, for at least one of the communication networks, information about the physical link configuration which offers the maximum throughput to the communication terminal from the communication network.

In Example 34, the subject matter of any one of Examples 19-33 can optionally include requesting, for at least one of the communication networks, information about physical link configurations that is available for the communication terminal.

In Example 35, the subject matter of any one of Examples 19-34 can optionally include requesting, for at least one of the communication networks, information about all physical link configurations that are available for the communication terminal.

In Example 36, the subject matter of any one of Examples 19-35 can optionally include the communication networks operating at least partially according to different radio access technologies.

Example 37 is a computer readable medium having recorded instructions thereon which, when executed by a processor, make the processor perform a method for performing radio communication according to any one of Examples 19 to 36.

Example 38 is a communication terminal comprising a determining means for determining, for each of a plurality of communication networks, a physical link configuration that is available for the communication terminal that provides a maximum throughput to the communication terminal among a number of physical link configurations that is available for the communication terminal; and a controlling means for checking, for each of the plurality of communication networks, whether a throughput criterion is met when the communication terminal communicates with the communication network with a physical link configuration that provides less than the maximum throughput among the number of physical link configurations that is available for the communication terminal and for establishing a communication link to one or more of the communication networks based on the result of the checking.

In Example 39, the subject matter of Example 38 can optionally include the controlling means being for establishing, for at least one of the communication networks, a communication link to the communication network with a physical link configuration that is less than the maximum throughput among the number of physical link configurations that is available for the communication terminal if the communication terminal meets the throughput criterion when the communication terminal communicates with the communication network with the physical link configuration.

In Example 40, the subject matter of any one of Examples 38-39 can optionally include the controlling means being for selecting one or more communication links to one or more of the communication networks and, for each of the one or more communication links, a physical link configuration, based on the result of the checking and being for establishing the selected one or more communication links with the selected physical link configurations.

In Example 41, the subject matter of Example 40 can optionally include the controlling means being for requesting, for each of the one or more selected communication links, establishment of the communication link with the selected physical link configuration from the respective communication network.

In Example 42, the subject matter of any one of Examples 40-41 can optionally include the controlling means being for selecting the one or more communication links based on a criterion for reducing the required transmission power operating the one or more communication links.

In Example 43, the subject matter of any one of Examples 40-42 can optionally include the controlling means being for selecting the one or more communication links based on a criterion for maximizing the frequency spectrum provided by the one or more communication links.

In Example 44, the subject matter of any one of Examples 40-43 can optionally include the controlling means being for selecting the one or more communication links based on a criterion for maximizing the transmission power efficiency provided by the one or more communication links.

In Example 45, the subject matter of any one of Examples 38-44 can optionally include the controlling means being for searching, for the communication networks and, for each of the plurality of communication networks, a set of available physical layer configurations for a communication link to the communication network, a communication configuration which includes a set of communication links and, for each communication link, a physical link configuration.

In Example 46, the subject matter of Examples 45 can optionally include the controlling means being for determining information about available communication networks based on at least one of a search performed by the communication terminal, a database query and information provided by another communication terminal.

In Example 47, the subject matter of any one of Examples 38-46 can optionally include the physical link configuration of a communication link including an amount of communication resources used for the communication link.

In Example 48, the subject matter of any one of Examples 38-46 can optionally include the physical link configuration of a communication link including a modulation and coding scheme used for the communication link.

In Example 49, the subject matter of any one of Examples 38-48 can optionally include the physical link configuration of a communication link including a code rate used for the communication link.

In Example 50, the subject matter of any one of Examples 38-49 can optionally include the physical link configuration of a communication link including a constellation type used for the communication link.

In Example 51, the subject matter of any one of Examples 38-50 can optionally include the physical link configuration of a communication link including a MAC mode used for the communication link.

In Example 52, the subject matter of any one of Examples 38-51 can optionally include the determining means being for requesting, for at least one of the communication networks, information about the physical link configuration which offers the maximum throughput to the communication terminal from the communication network.

In Example 53, the subject matter of any one of Examples 38-52 can optionally include the determining means being for requesting, for at least one of the communication networks, information about physical link configurations that is available for the communication terminal.

In Example 54, the subject matter of any one of Examples 38-53 can optionally include the determining means being for requesting, for at least one of the communication networks, information about all physical link configurations that are available for the communication terminal.

In Example 55, the subject matter of any one of Examples 38-54 can optionally include the communication networks operate at least partially according to different radio access technologies.

Example 56 is a method for determining communication links for a communication as illustrated in FIG. 6.

In Example 57, the subject matter of Example 56 is performed by a communication terminal.

In Example 58, the subject matter of any one of Examples 56-57 can optionally include the communication terminal requesting a one or more communication networks to set up communication links according to the communication configuration found.

In Example 59, the subject matter of any one of Examples 56-58 can optionally include eliminating, for a communication configuration found in the search and for a communication link included in the communication configuration found in the search the physical layer configuration of the communication link in the communication configuration found in the search from the set of available physical layer configurations of the communication link of to form an updated set of physical layer configurations for the communication link and repeating the search for a communication configuration based on the updated set of available physical layer configurations for the communication link.

In Example 60, the subject matter of any one of Examples 56-59 can optionally include the searching comprises searching for a communication configuration which is optimal according to the search criterion.

In Example 61, the subject matter of Example 60 can optionally include the search criterion including the throughput of the communication configuration being above a predetermined minimum throughput.

In Example 62, the subject matter of any one of Examples 60-61 can optionally include the search criterion including the required power of the communication configuration being as low as possible.

In Example 63, the subject matter of any one of Examples 56-62 can optionally include the searching comprising searching according to a search algorithm.

In Example 64, the subject matter of Examples 63 can optionally include the search algorithm having a restricted search space.

In Example 65, the subject matter of Example 64 can optionally include the search algorithm being restricted to an envelope function in a two-dimensional representation of the communication configurations.

In Example 66, the subject matter of any one of Examples 63-65 can optionally include the search algorithm being restricted to a convex envelope function in a two-dimensional representation of the communication configurations.

In Example 67, the subject matter of Example 66 can optionally include the two-dimensional representation represents each communication configuration as a point whose first coordinate corresponds to the throughput of the communication configuration and whose second coordinate corresponds to the transmission power of the communication configuration.

In Example 68, the subject matter of any one of Examples 56-67 can optionally include, for each communication link included in the communication configuration found in the search, eliminating the physical layer configuration of the communication link in the communication configuration found in the search from the set of available physical layer configurations of the communication link to form an updated set of physical layer configurations for the communication link and repeating the search for a communication configuration based on the updated set of available physical layer configurations for the communication link.

In Example 69, the subject matter of any one of Examples 56-68 can optionally include eliminating available physical layer configurations and repeating the search for a communication configuration based on a domain cut process.

Example 70 is a computer readable medium having recorded instructions thereon which, when executed by a processor, make the processor perform a method for performing radio communication according to any one of Examples 56 to 69.

Example 71 is a communication device as illustrated in FIG. 7.

In Example 72, the subject matter of Example 71 optionally is a communication terminal.

In Example 73, the subject matter of any one of Examples 71-72 can optionally include the transceiver being configured to request a one or more communication networks to set up communication links according to the communication configuration found.

In Example 74, the subject matter of any one of Examples 71-73 can optionally include the processor being further configured to eliminate, for a communication configuration found in the search and for a communication link included in the communication configuration found in the search the physical layer configuration of the communication link in the communication configuration found in the search from the set of available physical layer configurations of the communication link of to form an updated set of physical layer configurations for the communication link and repeat the search for a communication configuration based on the updated set of available physical layer configurations for the communication link.

In Example 75, the subject matter of any one of Examples 71-74 can optionally include the processor being configured to search for a communication configuration which is optimal according to the search criterion.

In Example 76, the subject matter of Example 75 can optionally include the search criterion including the throughput of the communication configuration being above a predetermined minimum throughput.

In Example 77, the subject matter of any one of Examples 75-76 can optionally include the search criterion including the required power of the communication configuration being as low as possible.

In Example 78, the subject matter of any one of Examples 71-77 can optionally include the processor being configured to search according to a search algorithm.

In Example 79, the subject matter of Example 78 can optionally include the search algorithm having a restricted search space.

In Example 80, the subject matter of Examples 79 can optionally include the search algorithm being restricted to an envelope function in a two-dimensional representation of the communication configurations.

In Example 81, the subject matter of any one of Examples 78-80 can optionally include the search algorithm being restricted to a convex envelope function in a two-dimensional representation of the communication configurations.

In Example 82, the subject matter of Example 81 can optionally include the two-dimensional representation representing each communication configuration as a point whose first coordinate corresponds to the throughput of the communication configuration and whose second coordinate corresponds to the transmission power of the communication configuration.

In Example 83, the subject matter of any one of Examples 81-82 can optionally include the processor being configured to, for each communication link included in the communication configuration found in the search, eliminate the physical layer configuration of the communication link in the communication configuration found in the search from the set of available physical layer configurations of the communication link to form an updated set of physical layer configurations for the communication link and repeat the search for a communication configuration based on the updated set of available physical layer configurations for the communication link.

In Example 84, the subject matter of any one of Examples 81-83 can optionally include the processor being configured to eliminate available physical layer configurations and to repeat the search for a communication configuration based on a domain cut process.

Example 85 is a communication device comprising a searching means for searching, for a set of communication links and, for each communication link, a set of available physical layer configurations, for a communication configuration which includes one or more communication links and, for each of the one or more communication links, an available physical link configuration based on a search criterion and an establishing means for establishing a communication according to a communication configuration found.

In Example 86, the subject matter of Example 85 optionally is a communication terminal.

In Example 87, the subject matter of any one of Examples 85-86 can optionally include the establishing means being for requesting a one or more communication networks to set up communication links according to the communication configuration found.

In Example 88, the subject matter of any one of Examples 85-87 can optionally include the searching means being further for eliminating, for a communication configuration found in the search and for a communication link included in the communication configuration found in the search the physical layer configuration of the communication link in the communication configuration found in the search from the set of available physical layer configurations of the communication link of to form an updated set of physical layer configurations for the communication link and repeating the search for a communication configuration based on the updated set of available physical layer configurations for the communication link.

In Example 89, the subject matter of any one of Examples 85-88 can optionally include the searching means being for searching for a communication configuration which is optimal according to the search criterion.

In Example 90, the subject matter of Example 89 can optionally include the search criterion including the throughput of the communication configuration being above a predetermined minimum throughput.

In Example 91, the subject matter of any one of Examples 89-90 can optionally include the search criterion including the required power of the communication configuration being as low as possible.

In Example 92, the subject matter of any one of Examples 85-91 can optionally include the searching means being for searching according to a search algorithm.

In Example 93, the subject matter of Example 92 can optionally include the search algorithm having a restricted search space.

In Example 94, the subject matter of Example 93 can optionally include the search algorithm being restricted to an envelope function in a two-dimensional representation of the communication configurations.

In Example 95, the subject matter of any one of Examples 92-94 can optionally include the search algorithm being restricted to a convex envelope function in a two-dimensional representation of the communication configurations.

In Example 96, the subject matter of Example 95 can optionally include the two-dimensional representation representing each communication configuration as a point whose first coordinate corresponds to the throughput of the communication configuration and whose second coordinate corresponds to the transmission power of the communication configuration.

In Example 97, the subject matter of any one of Examples 95-96 can optionally include the searching means being for, for each communication link included in the communication configuration found in the search, eliminating the physical layer configuration of the communication link in the communication configuration found in the search from the set of available physical layer configurations of the communication link to form an updated set of physical layer configurations for the communication link and repeating the search for a communication configuration based on the updated set of available physical layer configurations for the communication link.

In Example 98, the subject matter of any one of Examples 96-97 can optionally include the searching means being for eliminating available physical layer configurations and repeat the search for a communication configuration based on a domain cut process.

Example 99 is a communication terminal as illustrated in FIG. 8.

In Example 100, the subject matter of Example 99 can optionally include a determiner configured to determine the throughput of a first communication configuration and the throughput of a second communication configuration and a controller configured to control switching of communication between the first communication configuration and the second communication configuration based on the throughput of the first communication configuration and the throughput of the second communication configuration.

In Example 101, the subject matter of Example 100 can optionally include the controller being configured to determine the length of the periods of communication using the first communication configuration and the length of the periods of communication using the second communication configuration based on the throughput criterion, based on the first throughput and based on the second throughput.

In Example 102, the subject matter of any one of Examples 99-101 can optionally include the throughput criterion being a minimum throughput and the transceiver being configured to perform the communication alternately using the first communication configuration and the second communication configuration such that the average throughput of the communication is equal to or above the minimum throughput.

In Example 103, the subject matter of any one of Examples 99-102 can optionally include the throughput of the first communication configuration meeting the throughput criterion and the throughput of second communication configuration not meeting the throughput criterion.

In Example 104, the subject matter of any one of Examples 99-103 can optionally include a controller configured to determine a communication configuration with the first throughput and a communication configuration with the second throughput.

In Example 105, the subject matter of any one of Examples 99-104 can optionally include the first communication configuration and the second communication configuration including the usage of one or more communication links and the first communication configuration and the second communication configuration differing in the communication links used.

In Example 106, the subject matter of any one of Examples 99-105 can optionally include the first communication configuration and the second communication configuration differing in the carrier aggregation used.

Example 107 is a method for performing a communication as illustrated in FIG. 9.

In Example 108, the subject matter of Example 107 can optionally include determining the throughput of a first communication configuration and the throughput of a second communication configuration and controlling switching of communication between the first communication configuration and the second communication configuration based on the throughput of the first communication configuration and the throughput of the second communication configuration.

In Example 109, the subject matter of Example 108 can optionally include determining the length of the periods of communication using the first communication configuration and the length of the periods of communication using the second communication configuration based on the throughput criterion, based on the first throughput and based on the second throughput.

In Example 110, the subject matter of any one of Examples 107-110 can optionally include the throughput criterion being a minimum throughput and alternately using the first communication configuration and the second communication configuration such that the average throughput of the communication is equal to or above the minimum throughput.

In Example 111, the subject matter of any one of Examples 107-110 can optionally include the throughput of the first communication configuration meeting the throughput criterion and the throughput of second communication configuration not meeting the throughput criterion.

In Example 112, the subject matter of any one of Examples 107-111 can optionally include determining a communication configuration with the first throughput and a communication configuration with the second throughput.

In Example 113, the subject matter of any one of Examples 107-112 can optionally include the first communication configuration and the second communication configuration including the usage of one or more communication links and the first communication configuration and the second communication configuration differing in the communication links used.

In Example 114, the subject matter of any one of Examples 107-113 can optionally include the first communication configuration and the second communication configuration differing in the carrier aggregation used.

Example 115 is a computer readable medium having recorded instructions thereon which, when executed by a processor, make the processor perform a method for performing radio communication according to any one of Examples 107 to 114.

Example 116 is a communication terminal comprising a communication means for performing a communication alternately using a first communication configuration having a first throughput and a second communication configuration having a second throughput such that the average throughput of the communication meets a predetermined throughput criterion.

In Example 117, the subject matter of Example 116 can optionally include a determining means for determining the throughput of a first communication configuration and the throughput of a second communication configuration and a controlling means for controlling switching of communication between the first communication configuration and the second communication configuration based on the throughput of the first communication configuration and the throughput of the second communication configuration.

In Example 118, the subject matter of Example 117 can optionally include the controlling means being for determining the length of the periods of communication using the first communication configuration and the length of the periods of communication using the second communication configuration based on the throughput criterion, based on the first throughput and based on the second throughput.

In Example 119, the subject matter of any one of Examples 117-118 can optionally include the throughput criterion being a minimum throughput and the communication means being for performing the communication alternately using the first communication configuration and the second communication configuration such that the average throughput of the communication is equal to or above the minimum throughput.

In Example 120, the subject matter of any one of Examples 116-119 can optionally include the throughput of the first communication configuration meeting the throughput criterion and the throughput of second communication configuration not meeting the throughput criterion.

In Example 121, the subject matter of any one of Examples 116-120 can optionally include a controlling means for determining a communication configuration with the first throughput and a communication configuration with the second throughput.

In Example 122, the subject matter of any one of Examples 116-121 can optionally include the first communication configuration and the second communication configuration including the usage of one or more communication links and the first communication configuration and the second communication configuration differing in the communication links used.

In Example 123, the subject matter of any one of Examples 116-122 can optionally include the first communication configuration and the second communication configuration differing in the carrier aggregation used.

It should be noted that one or more of the features of any of the examples above may be combined with any one of the other examples.

In the following, examples are described in more detail. The following examples are described with reference to a mobile device in a heterogeneous multi-link radio context as illustrated in FIG. 10.

Figure 10:
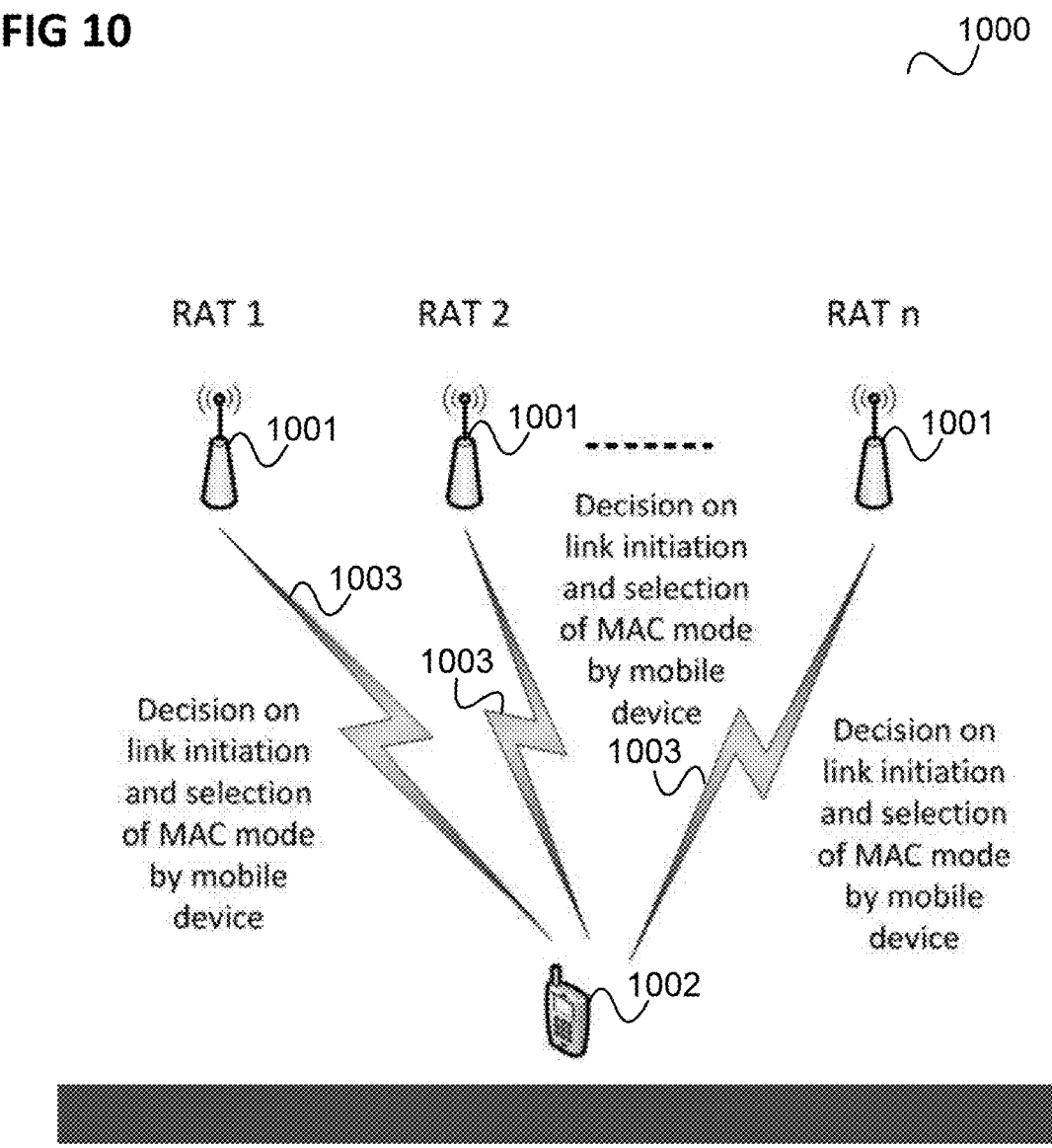
FIG. 10 shows a communication arrangement in a heterogeneous link scenario.

FIG. 10 shows a communication arrangement 1000.

The communication arrangement 1000 includes a plurality of base stations 1001 operated according to various RATs (radio access technologies, e.g. UMTS, LTE, WiFi, GSM etc.). The term base station is used to include access points such as in case the RAT is WiFi, for example. It should be noted that one or more of the base stations 1001 may also use the same RAT, e.g. may be the same type of communication network (e.g. LTE communication networks) of different operators.

The communication arrangement 1000 further includes a mobile device 1002 for which it is decided, for each base station 1001, whether a communication link 1003 is established to the base station 1001 and, if yes, which physical link configuration (including the MAC mode) is used for the communication link 1003. In the end, a communication configuration is selected for the mobile device 1002 that includes one or more communication links to one or more of the base stations 1001 and, for each communication link, an associated physical link configuration.

Figure 11:
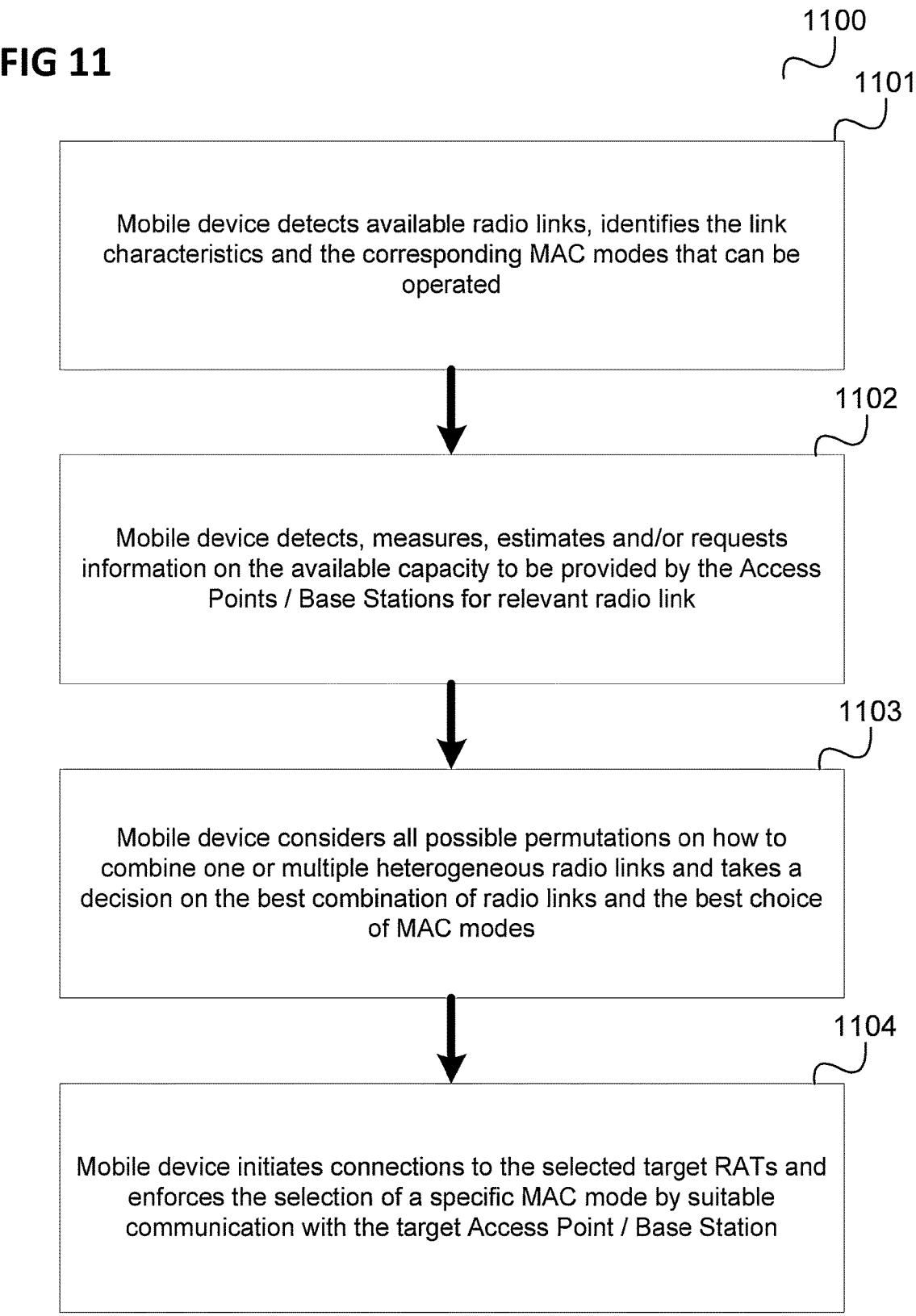
FIG. 11 shows a flow diagram illustrating a process for link in a mobile device.

FIG. 11 shows a flow diagram 1100 illustrating a process for link selection (i.e. communication configuration selection) in the mobile device 1002.

In 1101, the mobile device 1002 detects available radio communication links, identifies the link characteristics and the corresponding MAC modes that can be operated for the links. For example, for a given path loss and other propagation constraints it identifies a maximum supported MAC mode, including a maximum possible constellation type (e.g., BPSK, QPSK, QAM, etc.) combined with the highest code rate possible (e.g., R=2/3, etc.)).

In 1102, the mobile device detects 1002, measures, estimates and/or requests information on the available capacity to be provided by the base stations 1001 for a relevant radio link, e.g. a radio link that may be considered. For LTE, for example, the expected number of resource blocks to be allocated to a specific user (i.e. mobile device) typically depends on the load of the base station.

In 1103, the mobile device 1002 considers all possible combinations on how to combine one or multiple heterogeneous radio links 1003 and takes a decision on the best combination of radio links and the best choice of MAC modes. Typically, the best solution for a given mobile device is to get as much spectrum as possible and to operate very low MAC modes such as BPSK, R=1/2. This is however in contrast to the realistic constraints that a base station only allocates a limited number of time/frequency/space resources to a single user.

In 1104, the mobile device 1002 initiates connections to the selected target RATs and enforces the selection of a specific MAC mode by suitable communication with the base station.

It should be noted that the highest MAC mode possible (e.g. the MAC mode with highest spectral efficiency) may be derived based on available feedback info (such as CQI (channel quality indicator(s)), the rank of the MIMO channel matrix, available modes supported by the mobile device, etc.).

The mobile device may estimate the cell load e.g. as follows
i) the number of addressees of a base station can be observed by analyzing the transmitted packets and thus the base station's load can be estimated, i.e. a high number of addressed users imply a high cell load, a low number of addressed users imply a low cell load,
ii) the number of used resources for data services may be estimated. A low number of resources per user (e.g., resource blocks allocated to users, etc.) indicate a high load level, a high number of allocated resources per user indicate a low load level, etc. From this, available resources may be forecast (i.e., in case of high cell load, the available resources may be estimated to be low and in case of a low cell load, the available resources may be estimated to be high, etc.).

It should further be noted that typically, the lowest possible MAC mode (i.e. lowest in terms of spectral efficiency) is typically desirable to be used by the mobile device 1002 for uplink transmission, since it typically relates to the lowest power consumption possible. Indeed, from the point of view of the mobile device 1002, it is typically desirable to have the spectral bandwidth required for operating modes in the uplink as low as possible (e.g., BPSK, R=1/2, etc.) instead of highly spectrum efficient modes (e.g., QAM256, R=3/4, etc.). The reason lies in the fact that the SINR requirements grow approximately exponentially with spectral efficiency of the MAC modes while the resulting throughput does not.

In the following, further examples about how the mobile device 1002 may carry out 1101 to 1104 are given.

With respect to 1101, the mobile device 1002 detects available radio links, identifies the link characteristics and the corresponding MAC modes that can be operated. Also, the Mobile Device obtains link selection policies if desired by the concerned mobile operator.

The detection of available radio links can be achieved by various means. For example, the mobile device 1002 can receive such information through the ANDSF (Access Network Discovery and Selection Function) defined in 3GPP if the operator chooses to distribute the information and/or the ANQP (Access Network Query Protocol) in case of IEEE 802.11 or similar. Alternatively (or in addition to the information provided by the ANDSF), the mobile device 1002 can exchange related information with neighboring devices through peer-to-peer communication links (for example through device-to-device communication mechanisms). Alternatively (or in addition to the above), the mobile device 1002 can perform sensing of the available radio links. In case of a multitude of users, such sensing tasks can also be distributed through distributed sensing mechanisms, i.e. each mobile device only scans a small portion of the frequency band in question and then the information is exchanged among neighboring mobile devices or aggregated in a centralized point and then redistributed to the mobile devices.

A mobile network operator can have the possibility to provide link selection policies to the mobile device 1002. These are for example constraints to be considered in the link selection process in the mobile device. For example, the operator can give a preference to a given RAT (e.g., LTE) compared to other RATs (e.g., WiFi).

With respect to 1102, the mobile device detects, measures, estimates and/or requests information on the available capacity to be provided by the base station for a radio link between the base station and the mobile device.

For a mobile device centric decision making on the most optimum links to be selected, the mobile device needs to get knowledge on the actual capacity (i.e., number of resource blocks for LTE, data packet size for WiFi, etc.) that can finally be allocated to the user by the base station for a specific radio link.

Figure 12:
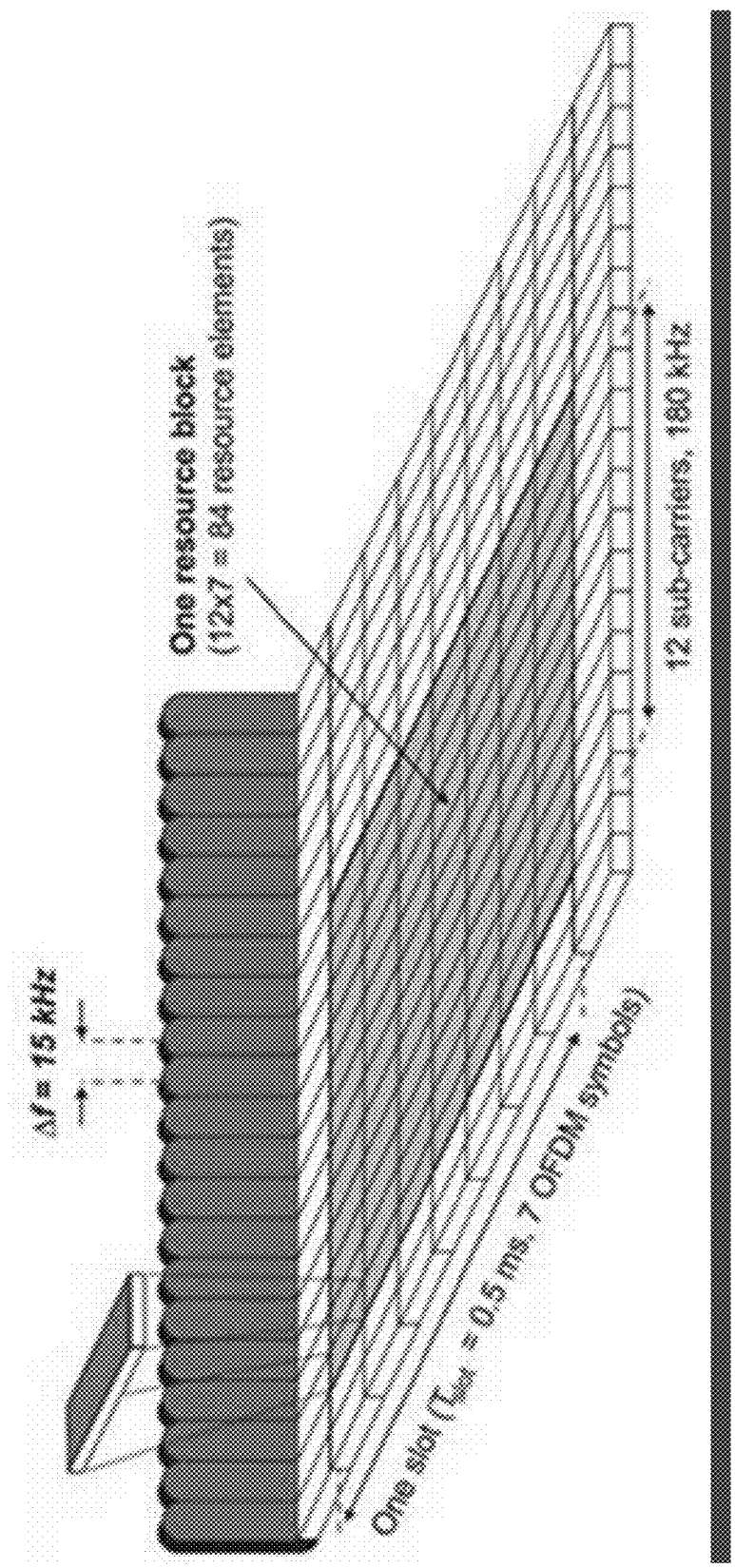
FIG. 12 shows resource blocks according to LTE.

In LTE, for example, a number of resource blocks are allocated per user, as illustrated in FIG. 12.

FIG. 12 shows resource blocks according to LTE.

According to LTE, OFDM symbols are grouped into resource blocks. The resource blocks have a total size of 180 kHz in the frequency domain and 0.5 ms in the time domain. Each 1 ms Transmission Time Interval (TTI) consists of two slots (Tslot).)

Figure 13:
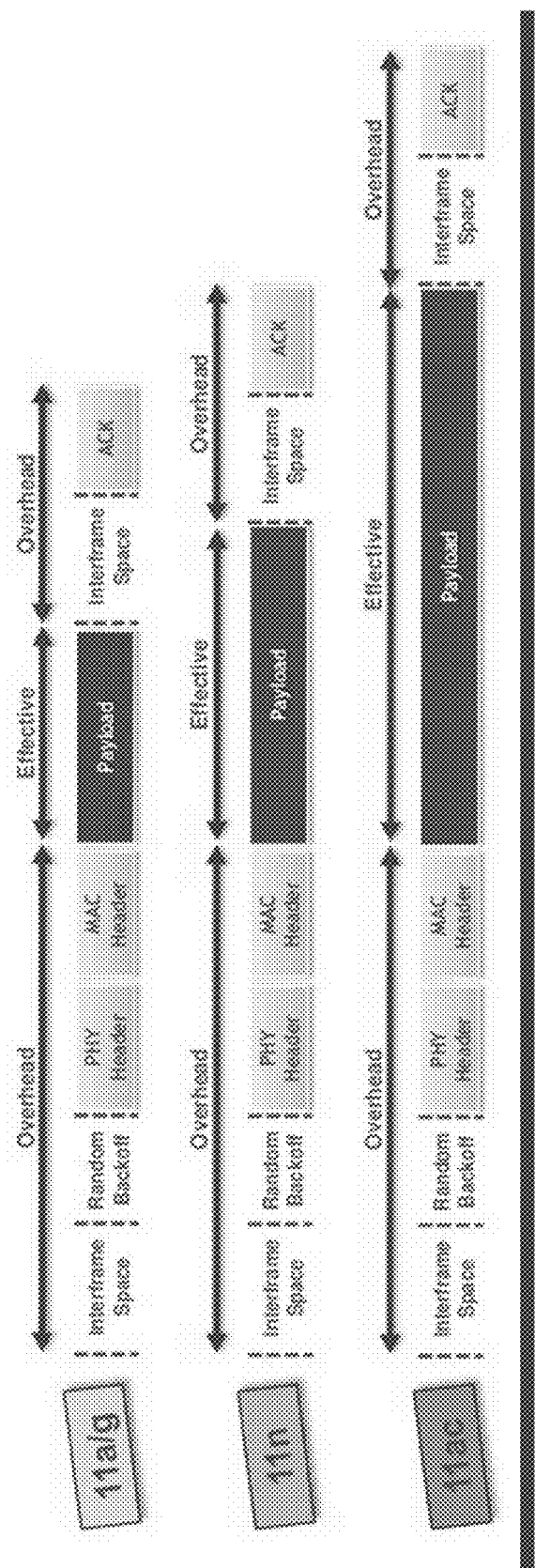
FIG. 13 shows the frame structures according to WiFi.

FIG. 13 shows the frame structures according to WiFi.

From top to bottom, FIG. 13 shows the frame structures according to IEEE 11a/g, IEEE 11n and IEEE 11ac.

FIG. 14 gives the frame sizes for IEEE 802.11b, IEEE 802.11a/g, IEEE 802.11n and IEEE 802.11ac.

For other systems, other resource management mechanisms may apply.

For example, in 1102, the mobile device contacts the base station 1101 and requests information about the possible allocation of resources. An LTE Base Station, for example, may answer with a projected number of resource blocks that can be allocated to the mobile device. Such a mechanism may for example be introduced in standardization. An example for an information exchange between the mobile device 1102 and the base station 1101 is illustrated in FIG. 15.

Figure 15:
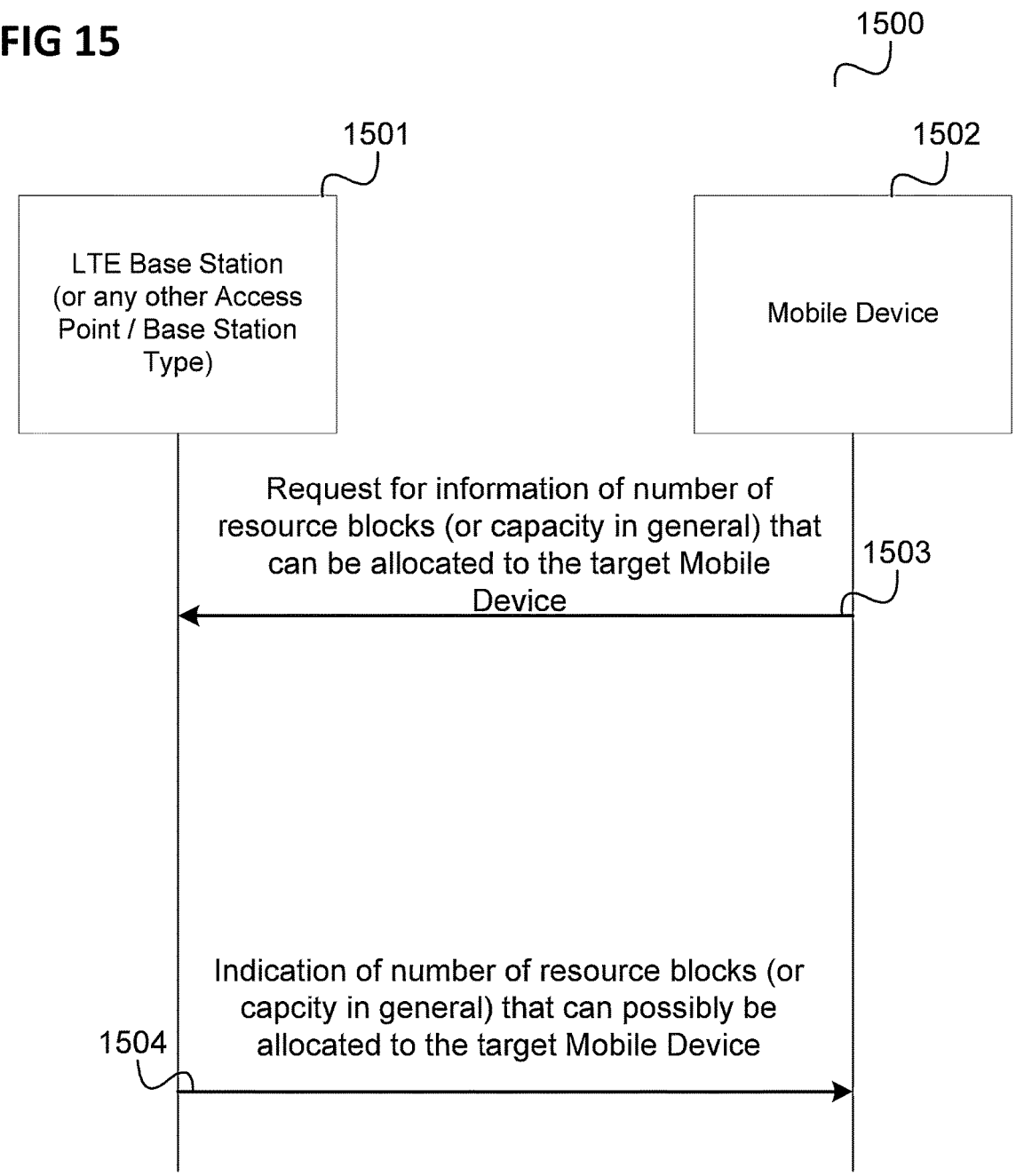
FIG. 15 shows a communication between an LTE base station, e.g. corresponding to one of the base stations, and a mobile device, e.g. corresponding to mobile device.

FIG. 15 shows a communication between an LTE base station 1501, e.g. corresponding to one of the base stations 1001, and a mobile device 1502, e.g. corresponding to mobile device 1002.

In 1503, the mobile device 1502 requests information about the number of resource blocks (or capacity in general) that can be allocated to the mobile device 1502 by the base station 1501.

In 1504, the base station 1501 indicates a number of resource blocks (or capacity in general) that can possibly be allocated to the mobile device 1502 in case it establishes a link to the base station 1501. Furthermore, the base station 1501 can provide information on the validity duration of the projected number of resource blocks (i.e., until when this number stays constant), information on the current load, information on the load fluctuation, information on the past allocations of resources, etc.

In case that a base station 1001 is not able or willing to provide the requested information, the concerned mobile device 1002 may for example try estimating of the current load state of the base station 1001. A rough classification of the load state may be sufficient, such as:

Low load
High load
or
Low load
Medium load
High load
or similar. The mobile device 1002 may identify this load state by scanning the air time of the given RAT (e.g., WiFi), by scanning how many resource blocks are allocated to users and how many are unused (e.g., for LTE), etc.

According to LTE, for instance, RSRQ (Reference Signal Received Quality) is defined as ratio of RSRP (Reference Signal Received Power) and RSSI (Received Signal Strength Indication) which the mobile device 1002 may use as a basic measure for cell load. Based on the estimated load level, the mobile device 1002 can derive a typical expected number of resource blocks that can be allocated to the mobile device 1002. In case of high load, the number is low and in case of low load, the expected number of resource blocks is high.

The mobile device 1002 may refine the estimate based on a history evaluation. For example, depending on the load estimates, the mobile device 1002 checks how many resource blocks have been allocated in similar situations in the past and takes a suitable average of the previous observations. In addition, it may take any kind of context information into account (such as its location, time of the day, user preferences, neighboring users, special events such as holidays etc.).

So, using the different channel conditions of each radio link in addition to the known MAC modes, the mobile device may define working points for that link.

Figure 16:
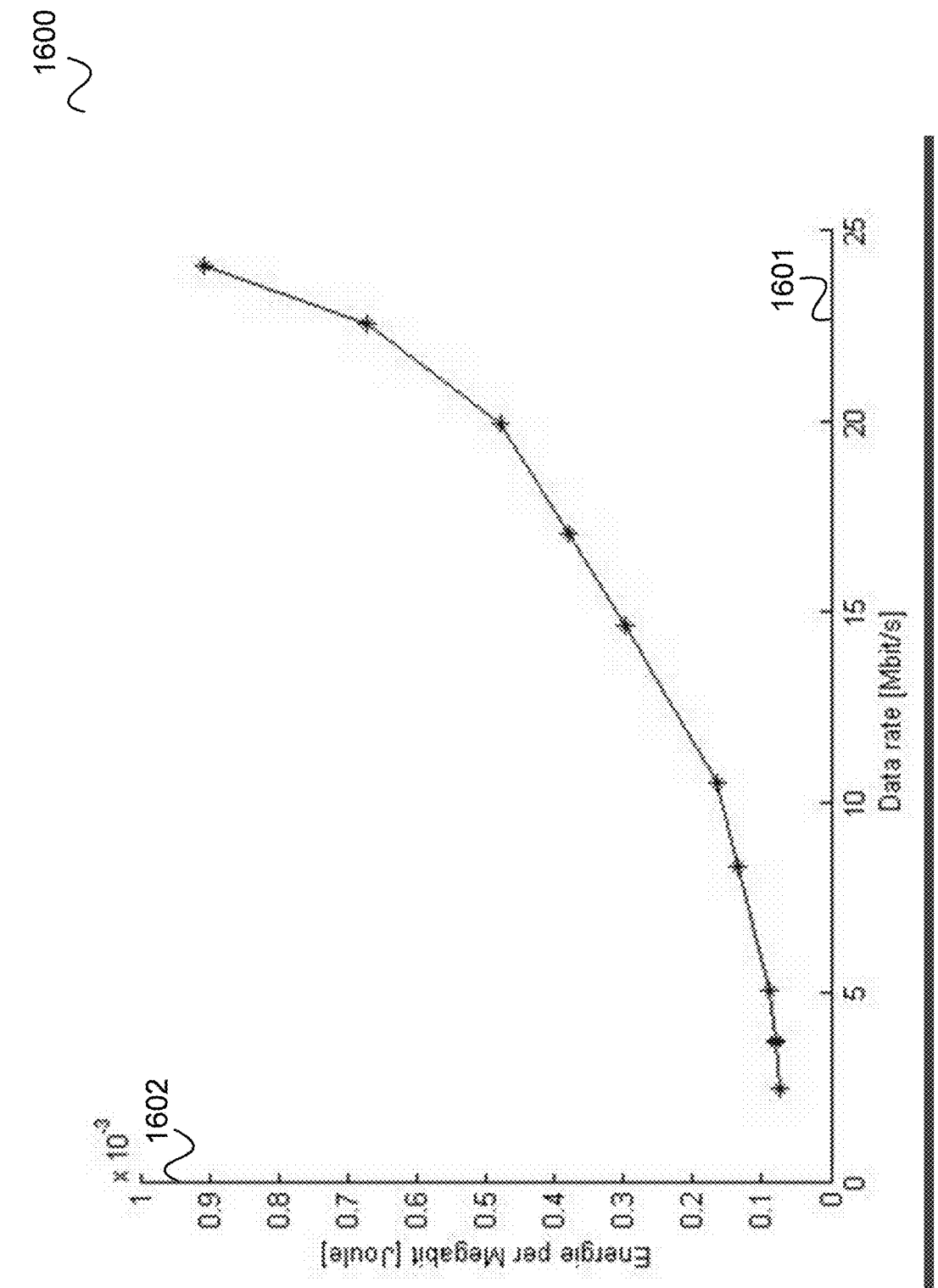
FIG. 16 shows a data rate-transmission power diagram.

FIG. 16 shows a data rate-transmission power diagram 1600.

Data rate (i.e. throughput) increases from left to right along a data rate axis 1601 and required transmission power increases from bottom to top along a power axis 1602.

The diagram 1600 illustrates estimated working points of an LTE uplink channel. It can be seen that the working points have a convex behavior, which justifies the use of a convex envelope search algorithm for the search of an optimum working point. It should be noted that a combination points such as illustrated in FIG. 16 for a plurality of communication links leads to working points which each correspond to a communication configuration as illustrated in FIG. 3.

It should be noted that the more reliable values the mobile device 1002 acquires, the more accurate choices it can make in 1103. Accordingly, it is desirable to generate good inputs for an appropriate optimization.

With respect to 1103, the mobile device 1002 considers all possible combinations on how to combine one or multiple heterogeneous radio links and takes a decision on the best combination of radio links and the best choice of MAC modes. An efficient optimization approach can be based, for example, on a discrete convex envelope optimization approach.

For the final selection, the mobile device 1002 may need to take operator policies into account if any of the operators chooses to impose such policies. Those policies typically limit the decision space of the mobile device centric decision making process and makes sure that the optimization leads to a result that is compatible with the user requirements. Indeed, the operator policies can sometimes contradict the preferences of the users since the objectives of the network and the mobile device regarding radio resource allocation typically contradict themselves. Namely, the network typically is interested in achieving an efficient overall operation for all users while a specific mobile device is only interested in its personal efficient operation. Still, there can be a compromise identified by the network imposing rules that limit the decision space in the mobile device, e.g. "prefer LTE over WiFi in case the signal quality of LTE is higher" or similar.

With respect to 1104, the mobile device 1002 initiates connections to the selected base stations 1001 and enforces the selection of a specific MAC mode by suitable communication with the respective base stations 1001.

The mobile device 1002 performs the initiation of the selected communication links and enforces the usage of the MAC modes selected for the communication links. The enforcement of MAC modes may require introduction of an information exchange between the mobile device 1002 and the base station 1001 which may for example be like illustrated in FIG. 17.

Figure 17:
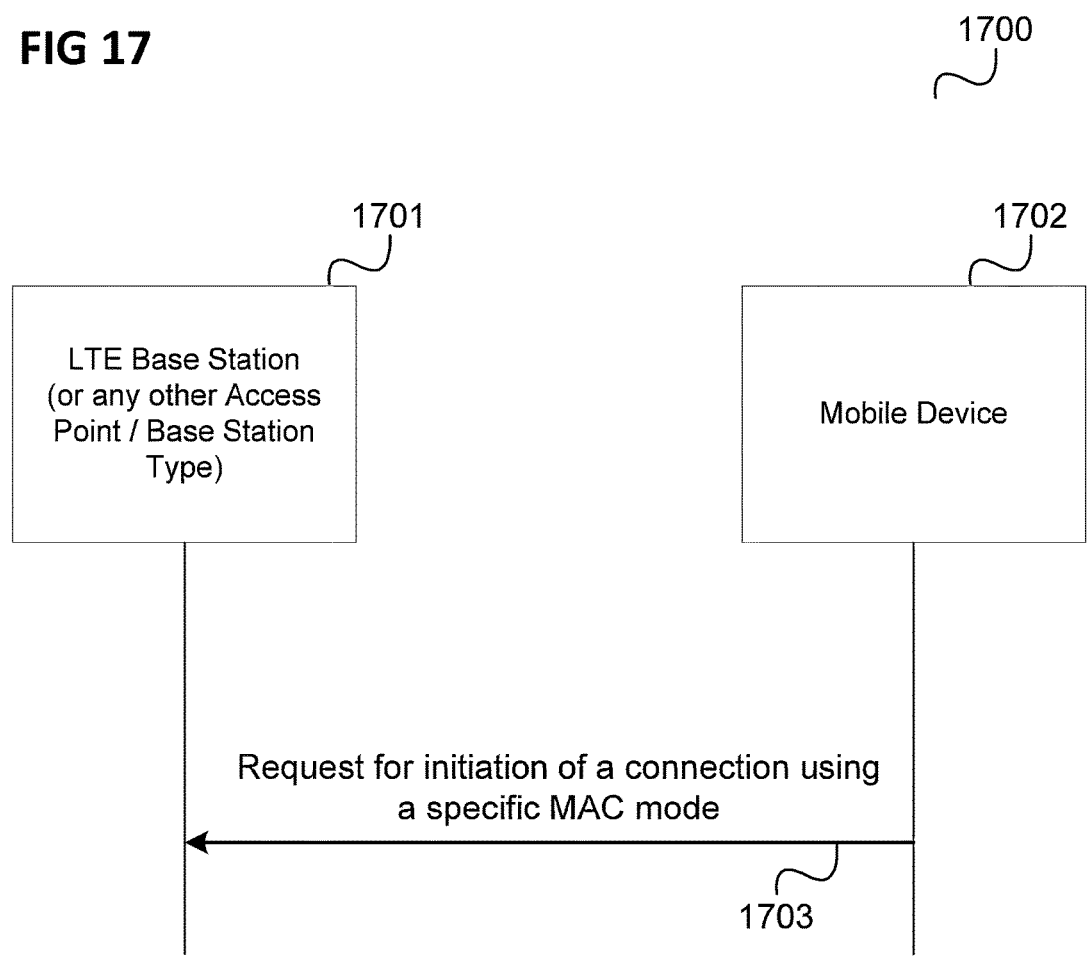
FIG. 17 shows a communication between an LTE base station, e.g. corresponding to one of the base stations, and a mobile device, e.g. corresponding to mobile device.

FIG. 17 shows a communication between an LTE base station 1701, e.g. corresponding to one of the base stations 1001, and a mobile device 1702, e.g. corresponding to mobile device 1002.

In 1703, the mobile device 1702 requests the initiation of a connection using a specific MAC mode (i.e., a specific modulation type such as BPSK/QPSK/QAM or similar and a specific code Rate such a R=1/2, R=2/3, R=374, etc.).

In some RATs, such as LTE or similar, the base station 1001 may not allow the device centric decision on the MAC modes to be used. However, the radio resource management algorithms of those RATs typically rely on device centric link quality measurements. The mobile device 1002 may thus use the link quality feedback to the base station 1001 in order to make the base station 1001 believe that a certain link quality is observed. The mobile device 1002 may choose the quality feedback (e.g. a quality value) in such a way that the RRM (radio resource management) entity of the base station 1001 is choosing the MAC mode desired by the mobile device 1002. This process may need several iterations, since the first feed-back of a link quality measurement may not lead to the exactly the desired MAC mode. In this case, the mobile device 1002 may modify the link quality feedback correspondingly (e.g. increase or decrease the value) in order to finally achieve the desired MAC mode.

Multi-link optimization can be very beneficial for the power consumption of a mobile device. Same mechanisms can be applied on the power consumption of base stations. For such a general optimization, similarly, feedback and negotiations between base stations and user equipments may be used.

For example, a master or similar base station may acquire knowledge or estimate the amount of granted spectral/time resources of other base stations and impose MAC modes for various heterogeneous links. Alternatively, a joint controller may be introduced which performs the configuration and interaction with all concerned heterogeneous base stations Therefore, it can be profitable for base stations to include mobile devices into decision making. Still, mobile device (e.g. UE) targets might differ from network targets. Sometimes, anarchic behavior may be beneficial for mobile devices. As long as networks do not suffer from this, it should be acceptable for them (like selecting private WiFi hotspots, which are out of operator control).

The communication configuration selection (e.g. uplink mode selection) in 1103 for example includes an optimization process which tries to find a working point (i.e. a suitable number of links to be operated simultaneously and the associated MAC modes) which meets the minimum throughput requirement of the mobile device 1002. For this optimization, typically a large number of possible combinations of all communication links and all MAC modes (or generally physical layer configurations) is present which makes the usage of highly efficient search algorithms desirable. It turns out that the working points leading to a minimum aggregate transmission (TX) power level (approximately) lie on a convex envelope function, such as the envelope function 305 in the example of FIG. 3.

The convex structure originates from the fact that MAC throughput curves typically require highly increase output power levels for more powerful constellation types. This effect is illustrated in FIG. 18.

Figure 18:
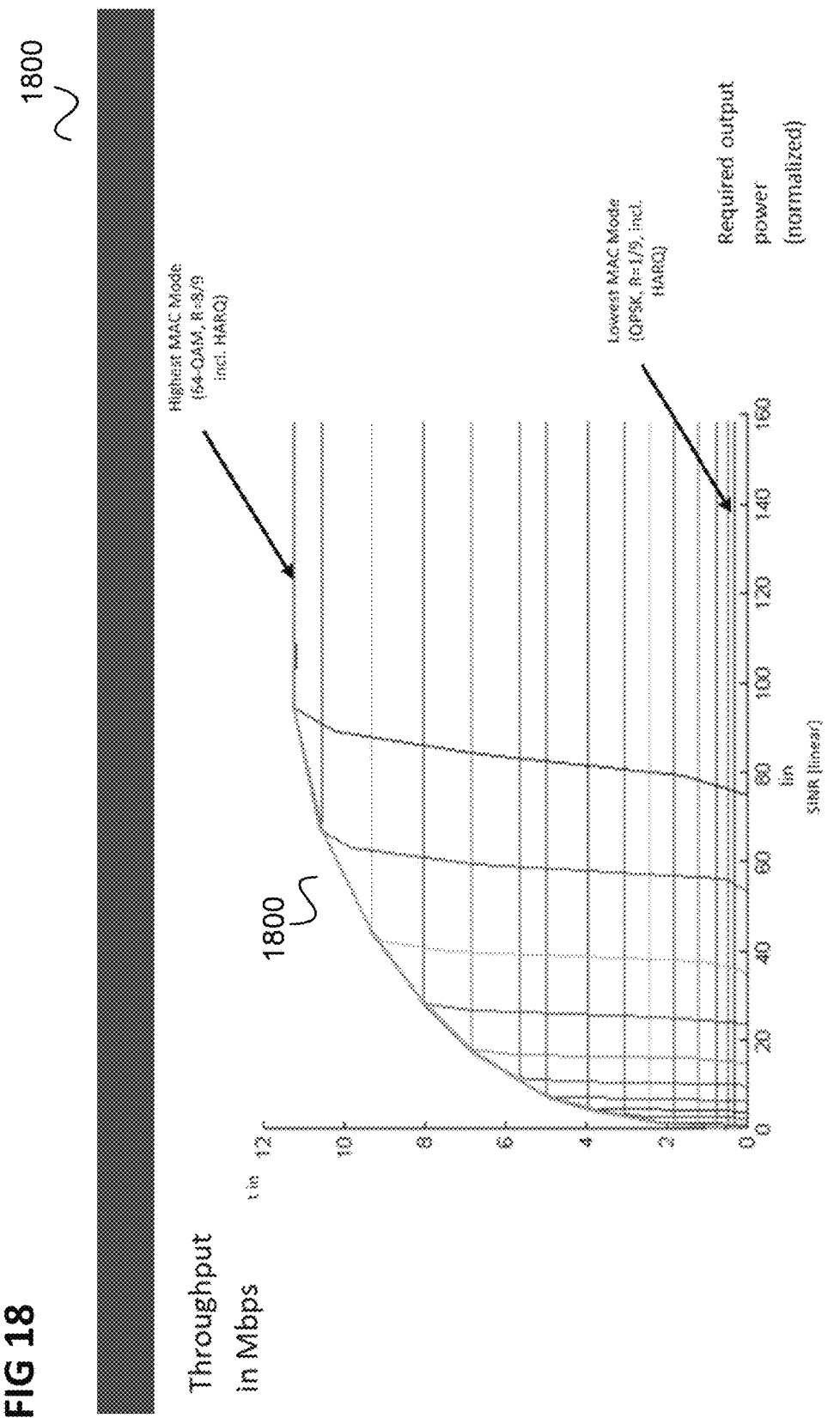
FIG. 18 shows a throughput graph for LTE.

FIG. 18 shows a throughput graph 1800 for LTE.

The graphs 1800 illustrate the relation between SINR (signal to interference and noise ratio), which can be seen as a representation of output power, and throughput for various MAC modes. It can be seen that the higher the throughput, the higher the required additional transmission power for an increase of throughput.

Thus, a discrete optimization algorithm may be used which exploits that behavior. As mentioned, a convex envelope search algorithm may be used, i.e. an optimization algorithm which searches on a convex envelope of the possible working points, i.e. which has a search set restricted to the convex envelope. The convex optimization approach by Shoham and Gersho for efficient bit allocation for an arbitrary set of quantizers may for example be used which is suitable since it is optimized for such a problem. It should be noted that the Shoham-Gersho optimization algorithm was developed for a very specific information theoretic optimization problem. Nevertheless, it matches the optimization needs for mobile device link selection (i.e. communication configuration selection).

The Shoham-Gersho algorithm can be seen to be based on the idea of instead of waiting for the Lagrangian multiplier λ to slowly reach a significant value for a new solution, it is possible to make λ to only take significant values for each iteration.

Specifically, the Shoham-Gersho algorithm minimizes the Lagrangian function for a given Lagrange multiplier vector lambda:

$$(L_\lambda)d(\lambda) = \inf_{x \in X} L(x, \lambda) = \inf_{x \in X}[(f(x) + \lambda(h(x) - b)]$$

where X is the search space, h(x)=(h$_1$(x), . . . , h$_2$(x)) is the vector of constraint functions, b is the vector of limits for the constraints, (i.e. the constraints are h$_i$(x)≤b$_i$) and f(x) is the cost function.

For each iteration k, the constraint function $$R_k = \sum_{i=1}^{n} h_i^k$$

(e.g. representing throughput) is calculated:

if Rk=Rmin (minimum value of constraint function, e.g. minimum throughput), the optimal allocation is found. The algorithms stops.

if Rk>Rmin, λ is updated to obtain a nearest value which comes closer to the constraint—smaller decrease.

if Rk<Rmin, λ is updated to obtain a nearest value which comes closer to the constraint—smaller increase.

if (Rk−Rmin) (Rk−1−Rmin)<0, the best allocation on the convex envelope is found and corresponds to the one fulfilling the constraint. The algorithms stops.

The condition here illustrates the fact that the algorithm went from the unfeasible to the feasible domain (or the other way around) over the convex envelope. A may be simply initialized with zero but more efficient initial values may be determined.

However, there is a sub-optimality of method convex envelope search method since it only identifies solutions which lie on the convex envelope function, e.g. the envelope function 305 of the example in FIG. 3. In the example of FIG. 3, the convex envelope search method would thus find a suboptimum solution as it is illustrated in FIG. 19.

Figure 19:
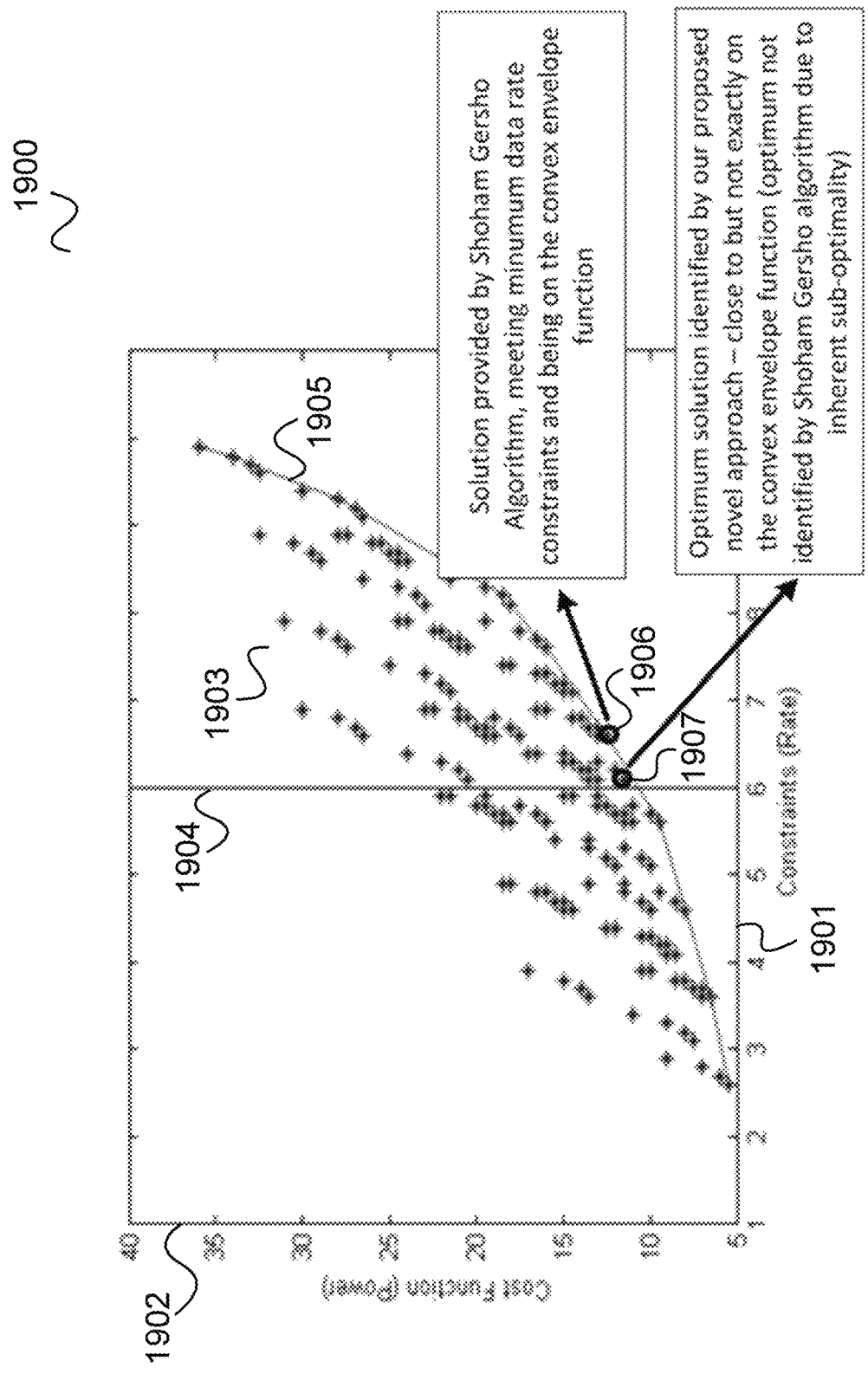
FIG. 19 shows a data rate-transmission power diagram.

FIG. 19 shows a data rate-transmission power diagram 1900.

As in FIG. 3, data rate (i.e. throughput) of a communication configuration increases from left to right along a data rate axis 1901 and required transmission power (which can be seen as the cost of a communication configuration) increases from bottom to top along a power axis 1902 and a plurality of working points 1903 are shown in the diagram 1900. A line 1904 gives an example for a target minimum throughput required by a mobile device, e.g. mobile device 1002.

A first working point 1906 is the solution found by the convex envelope search method, meeting the minimum data rate constraint and being on the convex envelope function.

However, a second working point 1907 would be the optimum solution: It has a lower output power than the first working point 1906 and still is to the right of line 1904, i.e. meets the throughput requirement. The second working point is close to but not exactly on the convex envelope function 1905. Thus, the convex envelope search method may not be able to find the optimum working point due to inherent sub-optimality coming from the restriction of the search space to the convex envelope function 1905.

It should be noted that optimization techniques that optimize only the configuration for the links individually are muss less efficient.

In the following, an approach is described as an example for communication configuration selection, e.g. carried out by mobile device 1002 in 1103, which can be seen as an extension of a convex envelope search method, namely as an iterative extension which allows to efficiently identify optimum or close-to-optimum working points in terms of required transmit power, each working point including the heterogeneous radio links to be operated simultaneously and the MAC mode (or generally the physical layer configuration) for each radio link (including constellation type per carrier, code rate, etc.).

A convex envelope search method works in such a way that the MAC modes are considered for each link independently. The algorithm performs the search not by considering the totality of all possible combinations, it rather performs the search on the convex envelope by working on the original independent MAC mode curves. This ensures high efficiency. This is illustrated in FIG. 20.

FIG. 20 shows throughput-output power diagrams 2001 for individual links and a throughput-output power diagram 2002 with working points, wherein each working point corresponds to a combination of one or more of the links with associated MAC modes.

This means that the throughput-output power diagram 2002 corresponds to the throughput-output power diagram 300 shown in FIG. 3 and is the result of the combination of the throughput-output power diagram 2001 for the individual links.

A convex envelope search method finds a working point 2003 which corresponds to a link working point 2004 for each individual link (provided that the link is present in the communication configuration corresponding to the working point 2004, otherwise, the link working point selected for the link can be seen to be the link working point "not established"). Thus, the selection of the working point 2004 corresponds to the selection of a link working point for each individual communication link, e.g. for each of the communication links 1003.

In the iterative extension of the convex envelope search method according to the present example, in a $0^{th}$ iteration, the a convex envelope search method is used to find the best solution 1906, 2003 on the convex envelope 1905, 2005 (which can be seen as an example of 601). If this solution 1906, 2003 is not the optimal solution, this means that the true solution 1907 is somewhere above the convex envelope 1905, 2005. In order to get the true solution on the convex envelope 1905, 2005, which permits an efficient use of the convex envelope search method, at least one point of the convex envelope 1905, 2005 is eliminated (which can be seen as an example of 602) such that the convex envelope is moved. This is done by eliminating only the previous solution, because all other working points are possible candidates for the true optimum solution.

As illustrated in FIG. 20, a working point is the combination of different modes on the links, i.e. of link working points. If one link working point is removed from one link, this eliminates many possible combinations (i.e. working points of 2002) and not just one. In order to eliminate just one working point of 2002, for each link, the link working point of the link in the working point of 2002 is eliminated and the search is continued for the resulting subset of working points separately.

In other words, if there are N links with $T_j$ (the set of possible working modes) and $m_j$ (the selected mode corresponding to the solution) for each link j, it means that the first considered set in the $0^{th}$ iteration is simply $\amalg_{j=1}^{N} T_j$. In order to remove just the solution corresponding to $[m_1 \ldots m_N]$, the set $\amalg_{j \neq i} T_j \times (T_i \backslash m_i)$ for each $i = 1 \ldots N$ is considered separately and the solution on the convex envelope of this set is searched. This allows eliminating the specific point found in the first iteration and modifying the convex envelope.

Since there are N links, the first iteration requires N separate searches and leads to N points that are found. For the second iteration, for each of these N points, the same method is performed in order to eliminate the point. So, if the single point found in the $0^{th}$ iteration is the $0^{th}$ level, then on the first level (corresponding to the first iteration), there are N working points and then $N^2$ working points on the second level. Generally, there are $N^p$ working points on the $p^{th}$ level.

It should be noted that there is no guarantee on which level the true solution would be found: it can be the first working point found without any iterations or it can be found after 4 or 5 iterations. As it is typically unpractical to go over a large number of iterations, a limited number of levels (i.e. iterations) is for example chosen. A higher number means better chances to get the true solution, but means also more complexity and more computational effort.

Figure 21:
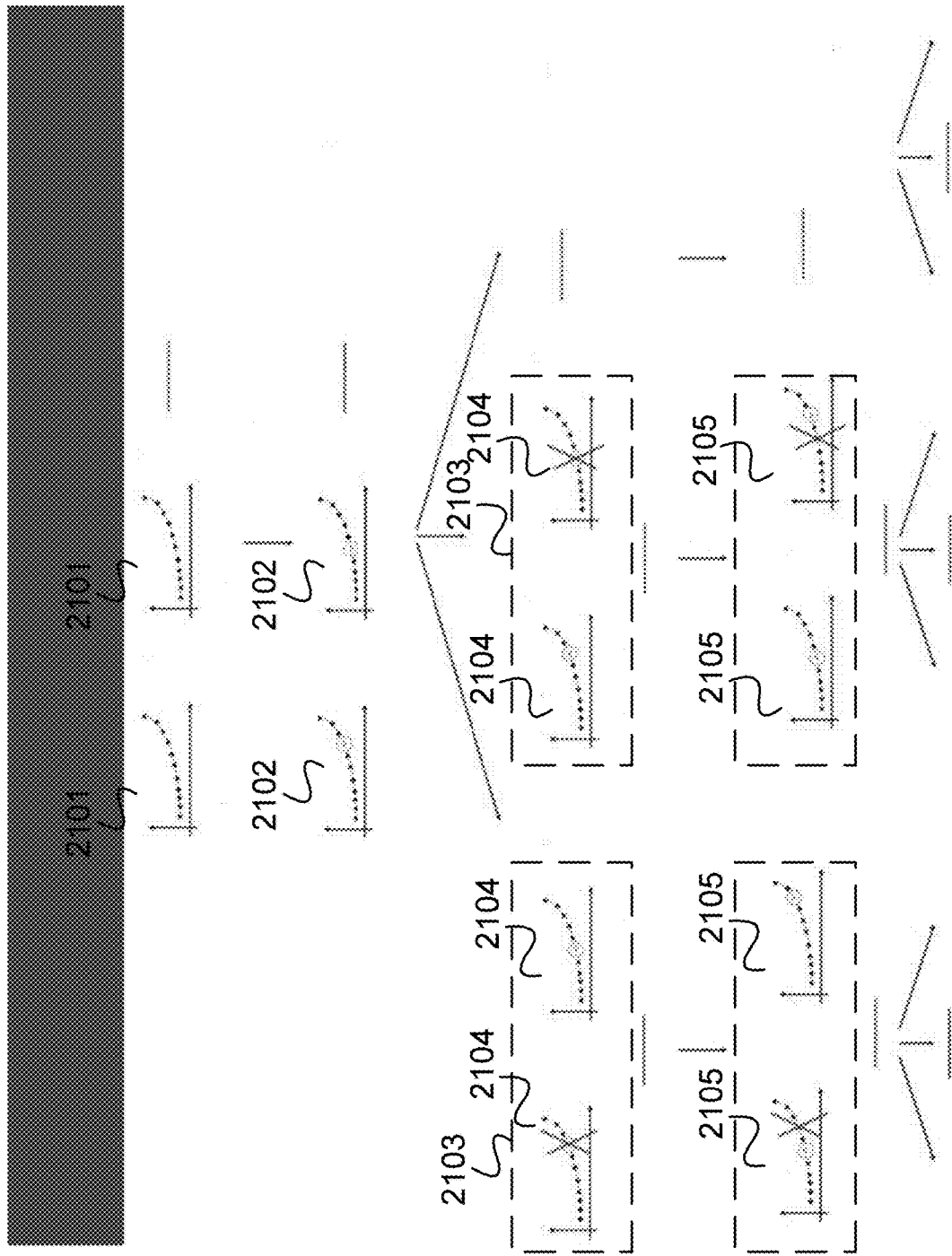
FIG. 21 illustrates the removal of working points resulting in multiple levels.

FIG. 21 illustrates the removal of working points resulting in the multiple levels as described above.

Diagrams 2101 illustrate the (e.g. N) link working points of the various possible links.

Diagrams 2102 on the $0^{th}$ level illustrate the link working points corresponding to the working point found in the $0^{th}$ iteration.

In the first iteration, there are N sets 2103 of diagrams 2104. Each set 2103 includes one diagram 2104 in which one link working point (of one of the N links) is eliminated.

For each set 2103, a search is carried out leading to a working point corresponding to link working points in the diagrams 2104. This is illustrated by diagrams 2105.

This process continues until, for example, a predefined maximum number of iterations (e.g. 2 iterations, 3 iterations or 4 iterations) has been reached.

In the following, an example is described that aims at finding the true solution and only stops when all possible working points have been discarded. This example can be seen to be based on a combination of a convex envelope search method with an elimination of unneeded points by separation of the set of working points into sub-blocks, wherein a sub-block is either eliminated or a search is carried out for the sub-block. The search within one sub-block is for done exactly like for the whole set of working points using a convex envelope search method, but the separation into sub-blocks and elimination of sub-blocks is done using a domain-cut variant of a branch and bound algorithm.

In the following, an example of an elimination of how unneeded blocks in a two-dimensional case (i.e. involving two radio links) is given. A convex optimization algorithm may be used to determine the first feasible working point (i.e. the working point which fulfills the throughput requirement and has lowest cost in terms of transmit power) and the first unfeasible point (i.e. the working point which does not fulfills the throughput requirement but has the highest throughput) on the convex envelope as illustrated in FIG. 22.

Figure 22:
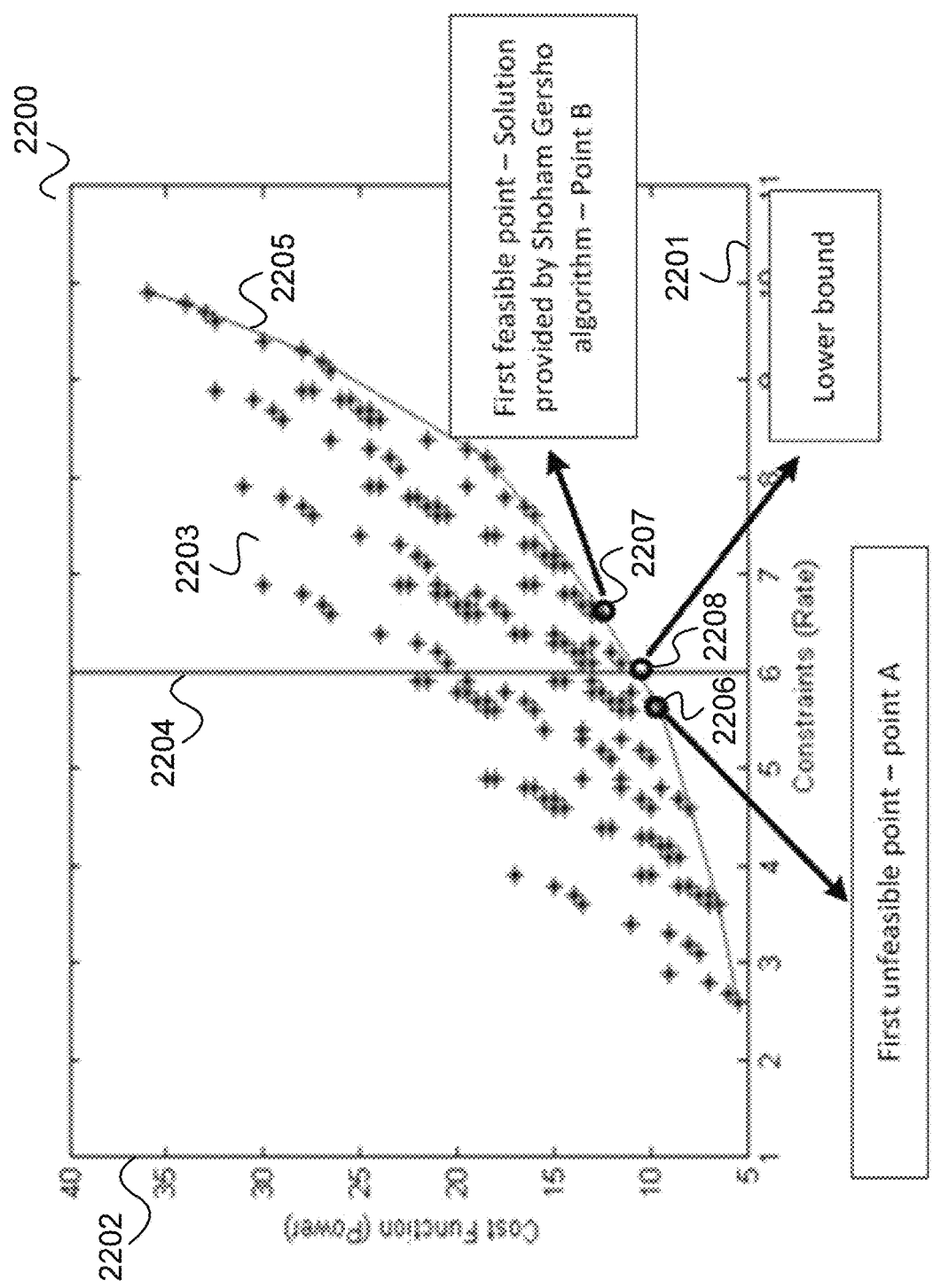
FIG. 22 shows a data rate-transmission power diagram.

FIG. 22 shows a data rate-transmission power diagram 2200.

As in FIG. 3, data rate (i.e. throughput) of a communication configuration increases from left to right along a data rate axis 2201 and required transmission power (which can be seen as the cost of a communication configuration) increases from bottom to top along a power axis 2202 and a plurality of working points 2203 are shown in the diagram 2200. A line 2204 gives an example for a target minimum throughput required by a mobile device, e.g. mobile device 1002.

A first working point 2206 is the first unfeasible point (on the convex envelope 2205), also referred to as point A.

A second working point 2207 on the convex envelope 2205 is the solution found by the convex envelope search method. This is the first feasible working point (on the convex envelope 2205), also referred to as point B.

Each of the working points 2206, 2207 correspond to a specific combination of selected links with associated selected MAC modes. These MAC modes allows splitting the whole set of combinations (i.e. the whole set of working points 2203) into known and unknown areas. For the present two-dimensional case, this is illustrated in FIG. 23.

Figure 23:
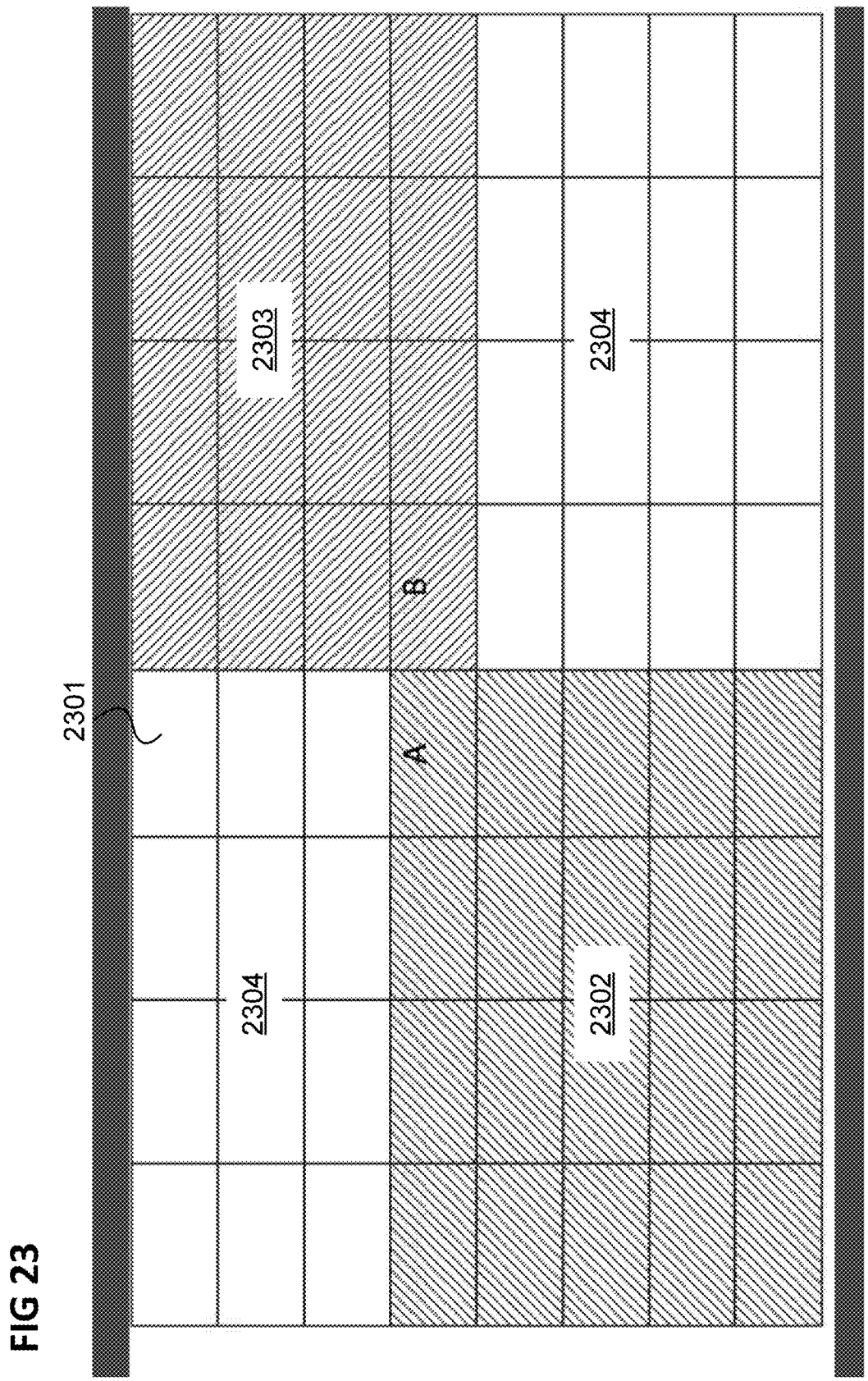
FIG. 23 illustrates a separation of the set of working points into sub-blocks.

FIG. 23 illustrates a separation of the set of working points into sub-blocks.

In FIG. 23, the horizontal direction corresponds to the modes of a first of the two links and the vertical direction corresponds to the modes of a second of the two links.

Each box 2301 in FIG. 23 corresponds to a working point wherein the efficiency of the MAC mode of the first link increases from left to right and the efficiency of the MAC mode of the second link increases from bottom to top.

Thus, first unfeasible point A defines a first sub-block 2302 of unfeasible points, as any working point in this sub-block has a MAC mode in at least one of the links which is less efficient that the MAC modes of point A and therefore, the throughput of this working point is less than that of point A and thus does not permit to meet the minimum throughput constraint.

Similarly, the first feasible point B defines a second sub-block 2303 of unpromising points because those points have a higher cost than point B.

So, the working points of the first sub-block 2302 and the working points of the second sub-block 2303 can be discarded (i.e. excluded from the further search).

The remaining working points are still to be analyzed (i.e. included in the further search). They are grouped into a third sub-block 2304 and a fourth sub-block 2305 and for each of these sub-blocks (rectangles for the two-link case, boxes for the three-link case) a search is carried out similarly to the original complete set of working points 2203.

The first feasible point B (initial solution) is for example determined using the initial solution based on the convex envelope search method. The solution corresponds to a specific MAC mode for each link. As explained, the solution may be suboptimal and the separation and elimination process allows checking whether there is a better working point which is not present on the convex envelope. The difference to the approach illustrated in FIG. 21 can be seen in the fact that in the separation and blocking process as illustrated in FIG. 23, all unpromising points and not just the found solution are eliminated.

In a multidimensional domain (e.g. a box in 3D etc.) as an input for the convex optimization there are three possible results:

1) All working points are feasible and the minimum one can be taken and compared to the current solution in order to update the solution;
2) All working points are unfeasible and can be discarded;
3) The usual case with feasible and unfeasible points such that some working points can be discarded and other are kept as illustrated in FIG. 23.

Only the case 3) is susceptible for the domain-cut process as explained with reference to FIG. 23. The input of the process includes the modes for the links of the first feasible point and the first unfeasible point. This input permits defining the set of unknown (or not processed) points that are kept for the further search. Moreover this input allows presenting them in a suitable way as clear sub-domains (e.g., rectangles for 2-D as illustrated in FIG. 23 and boxes for 3-D, etc.) which is for example necessary for the next application of the convex envelope search method. For this, the previous point found in the search is for example saved, because both feasible and unfeasible (near to the constraint) working points should be kept.

When the number of links is higher than three, it is in general not trivial how to split the remaining areas into suitable sub-blocks but this can be done using a domain cut algorithm. The results of the domain cut algorithm are remaining subdomains (e.g. sub-blocks in the two-dimensional case) of unprocessed points. They are added to the list of unprocessed domains. For example, the domain-cut algorithm applied to the example of FIG. 23 generates two subdomains: the first is [1 . . . 4]×[6 . . . 8] (North-West) and the second is [5 . . . 8]×[1 . . . 4] (South-East), with a numbering of MAC modes from 1 to 8 both horizontally and vertically.

In results 1) and 3) of the possible results of the domain-cut algorithm as given above, there is a possible solution (i.e. a feasible working point). This is compared to the current solution for a potential update of the current solution (wherein the initial solution comes from the application of the convex search algorithm to the whole set of working points).

In result 3), the sub-blocks of working points that are kept may be associated with a certain lower bound value (as illustrated as working point 2208 in FIG. 22) which indicates how promising those sub-blocks are.

In the managing of the remaining sub-blocks (i.e. the sub-blocks still to be searched) a processed sub-block is eliminated and new ones (coming from the domain-cut algorithm in case of result 3) are added. For every added sub-block or updated solution, it is possible to discard sub-blocks, whose corresponding lower bounds are higher than the current solution, which means they are not promising anymore. Moreover, it is possible to start with sub-blocks with smaller lower bounds, because they are more likely to generate better solutions.

The search process is ended when there are no sub-blocks left for processing, i.e. the list of sub-blocks to be processed is empty.

Table 1 gives a comparison of communication configuration selection according to a convex envelope search method (the values have been generated using the Shoham-Gersho algorithm as described above), communication configuration selection according to the approach illustrated in FIG. 21 going to level 2, communication configuration selection according to the approach illustrated in FIG. 21 going to level 3 and communication configuration selection according to the approach illustrated in FIG. 23.

TABLE 1

| | Number of Links | | | | |
|---|---|---|---|---|---|
| | 2 | 3 | 4 | 5 | 6 |
| Convex optimization | +74.3% +2.1% | −76% +2% | −97.1% +2.7% | −99.65% +2.2% | −99.96% +2.7% |
| Approach of FIG. 21 (level 2) | +246% +0.7% | −44% +0.87% | −92.4% +1.1% | −99.04% +0.49% | −99.89% +0.6% |
| Approach of FIG. 21 (level 3) | +668% +0.5% | +44% +0.23% | −74.7% 0.2% | −96.12% +0.1% | −99.46% +0.2% |
| Approach of FIG. 23 | +247% +0% | −12.5% +0% | −82.4% +0% | −96.96% +0% | −99.58% +0% |

The numbers in table 1 are based on the following complexity metric: The number of comparisons, multiplications, divisions, additions and subtractions are added. Other complexity metrics may be used, for example using a stronger weight for multiplications compared to additions, etc.

Table 1 presents a performance comparison of the various approaches with the exhaustive search performance (in percentage). For each approach, the bottom values evaluate the computational effort difference and the upper values show the gap between real solutions and solutions given by the corresponding approach. It can be seen that solutions given by the configuration selection according to the approach illustrated in FIG. 23 (based on the modified domain cut algorithm) are exact solutions as expected. However, the configuration selection according to the approach illustrated in FIG. 21 (based on modified the convex envelope search approach, wherein the level indicates the number of iterations with each iteration suppressing a link configuration for a selected RAT leading to a new convex envelope function that typically leads to a more optimum solution in case that it exists) delivers sub-optimal solutions. Moreover the convex algorithms are quite efficient with a high number of links.

In the following, an example for a time-sharing approach between two working points (i.e. two communication configurations) is described.

For this a first optimum working point (in the sense that it lies on the convex envelope function) just below the minimum throughput requirements and a second optimum working point (in the sense that it lies on the convex envelope function) just above the minimum throughput requirements are identified, e.g. points A and B in FIG. 22.

The identification of these two working points does not lead to a higher complexity since convex envelope search algorithms typically automatically identify all working points on the convex envelope function starting from the lowest (throughput) value up to the highest (throughput) value. By finding the second working point, thus the first working point is also generated in the search process at no higher cost.

In the operation of the mobile device 1002 according to the present approach, the mobile device may apply for the uplink the minimum transmission output power levels required for maintaining the target radio link choices. The present approach can be used for any two working points among the multitude of available communication configurations. It is not required that those two lie on the convex envelope function.

The mobile device 1002 applies a time sharing between the two identified working points, i.e. switches between the communication configurations of the two working points.

For this, in this example, the mobile device 1002 identifies the time sharing approach to be used in order to exactly meet the minimum throughput requirements (e.g. imposed by the user), indicated by line 2204 in FIG. 22.

The mobile device 1002 may derive the time sharing relationship from the following variables:

Average throughput achieved for first working point R1 (may be derived from optimization), Average throughput achieved for second working point R2 (may be derived from optimization), Minimum data rate requirement (e.g. imposed by the user) Rmin From this, the mobile device may derive the time Sharing factor for first the working point cf, wherein 0<=cf<=1 with 0 corresponding to 0% of sharing time being applied to the first working point and 100% of sharing time being applied to the second working point, with 0.5 corresponding to 50% of sharing time being applied to first working point and 50% of sharing time being applied to the second working point and so on. The actual derivation is given by the constraint $$cf*R1+(1-cf)*R2=Rmin$$

with the solution $$cf=(Rmin-R2)/(R1-R2)$$

Based on this result, the mobile device performs a time sharing between the set of radio links corresponding to the first working point and the second working point. The percentage of time to be allocated to both working points is given by the value cf which lies between 0 and 1.

The actual time sharing can be applied in various ways.

A first way is to split an entire transmission, e.g. an FTP transfer of a file, split into two parts—one applying the first working point (i.e., the target mobile device initiating radio links and enforcing the MAC mode configuration corresponding to the first working point) and one applying the second working point (i.e., the target mobile device initiating radio links and enforcing the MAC mode configuration corresponding to the second working point). The splitting ratio between the two transmissions is given by cf, i.e. if the total projected transmission time is Ttot, the duration of the first transmission (applying the first working point) is cf*Ttot and the duration of the second transmission (applying the second working point) is (1-cf)*Ttot. Such a split finally leads to the intended transmission of an amount of data corresponding to Rmin*Tot. This approach is illustrated in FIG. 24.

Figure 24:
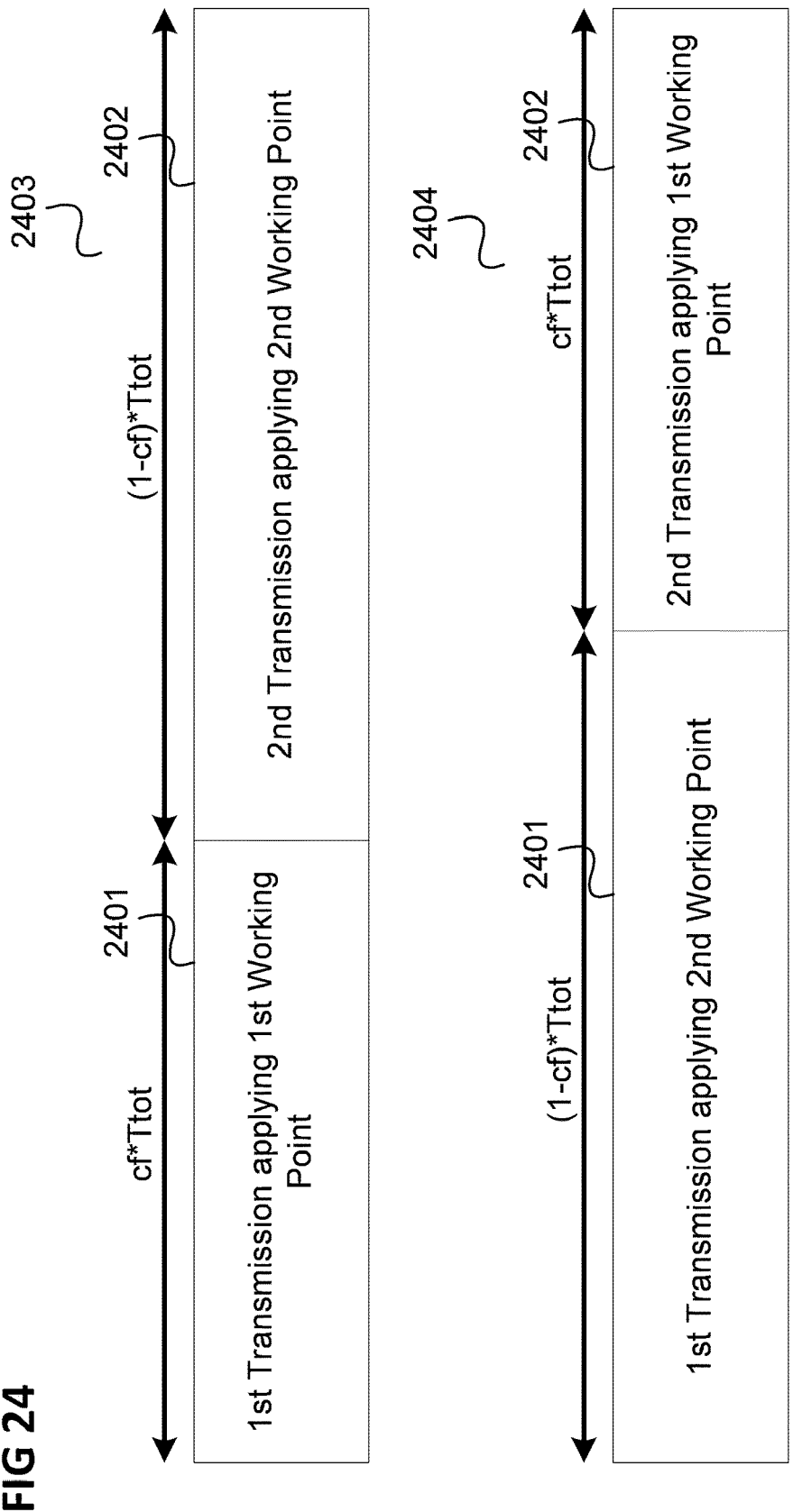
FIG. 24 shows transmission diagrams, illustrating the splitting of a transmission into a first transmission and a second transmission.

FIG. 24 shows transmission diagrams 2403, 2404 illustrating the splitting of a transmission into a first transmission 2401 and a second transmission 2402.

In the upper transmission diagram 2403, the first transmission 2401 uses the first working point and the second transmission 2402 uses the second working point while in the bottom transmission diagram 2404 the first transmission 2401 uses the second working point and the second transmission 2402 uses the first working point.

In case that the projected transmission time does not exactly correspond to the real transmission time (for example due to unexpected changes in the radio link characteristics, etc.), the second transmission 2402 may be simply extended or shortened as required. Also, a short transmission pause may be introduced when switching from the first working point to the second working point or vice versa. This may for example be necessary since typically the establishment of new radio links and/or the termination of active radio links requires some time that needs to be spent between the end of the first transmission 2401 and the start of the second transmission 2402. If the total transmission time should be below a maximum threshold, this switching time may be taken into account by the mobile device when determining the minimum required data rate. For example, if the mobile device increases the required data rate used for determining cf, the Mobile Device can spend some switching time between the first transmission 2401 and the second transmission 2402 while keeping an overall transmission time target.

Another way of time sharing is to split the overall transmission time into multiple time fractions, e.g. n time fractions of length DeltaT such that n*DeltaT=Ttot. For each of the time fractions, the split according to cf can be applied as illustrated in FIG. 25.

Figure 25:
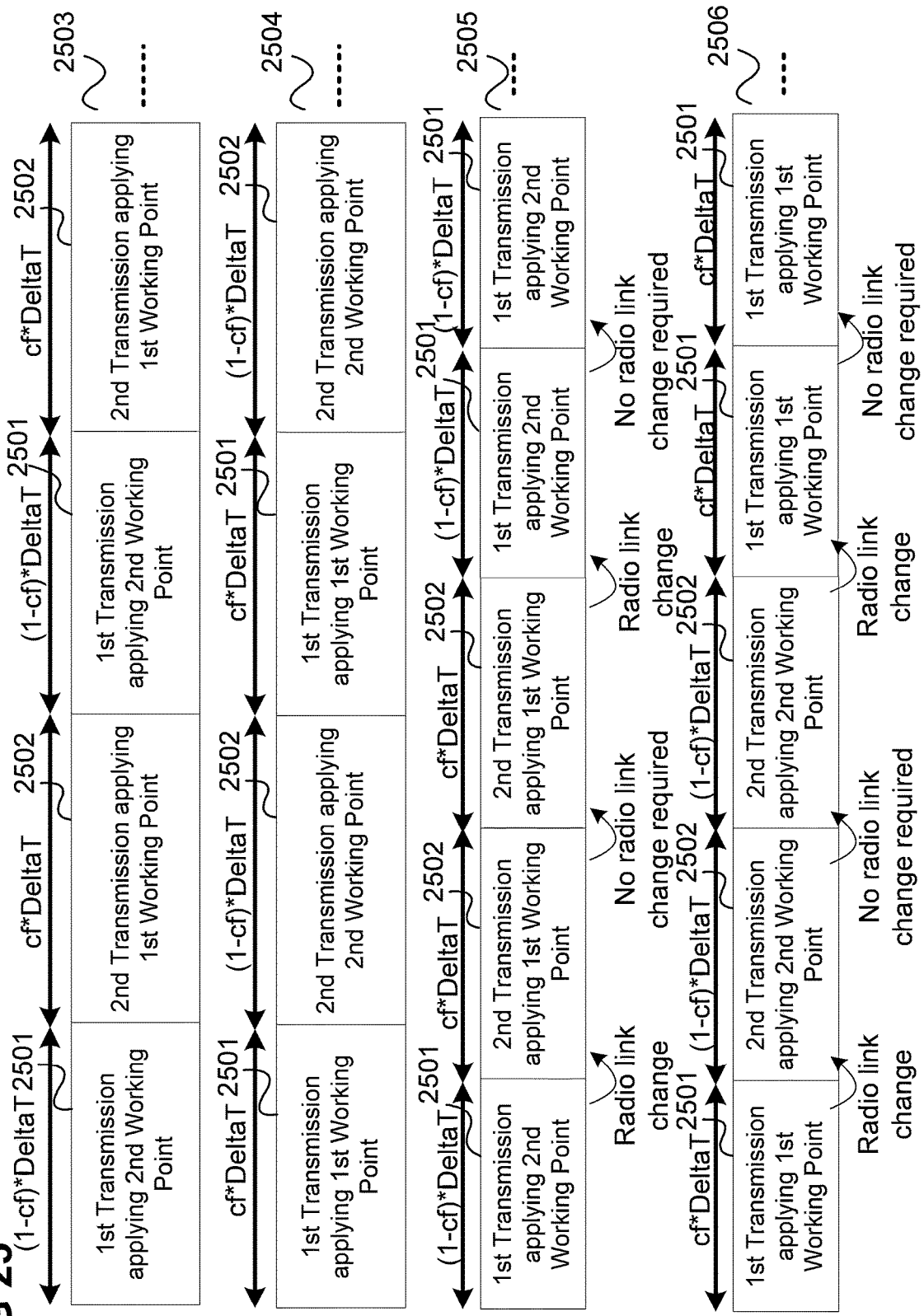
FIG. 25 shows transmission diagrams, illustrating the splitting of a transmission into multiple first transmissions and multiple second transmissions.

FIG. 25 shows transmission diagrams 2503, 2504, 2505, 2506 illustrating the splitting of a transmission into multiple first transmissions 2501 and multiple second transmissions 2502.

In the first (top) transmission diagram 2503, there are two time fractions, each having a first transmission 2501 using the second working point and a second transmission 2502 using the first working point.

In the second transmission diagram 2504, there are two time fractions, each having a first transmission 2501 using the first working point and a second transmission 2502 using the second working point.

The approaches according to the first transmission diagram 2503 and the second transmission diagram 2504 may for example be improved by the approach illustrated by the third transmission diagram 2505 in which after first transmission 2501 using the second working point two consecutive second transmissions 2502 using the first working point are carried out. This approach minimizes the number of times the communication configuration is switched and thus the time switch expenses.

Similarly, in the fourth transmission diagram 2506 after a first transmission 2501 using the first working point two consecutive second transmissions 2502 using the second working point are carried out.

In case that the projected transmission time does not exactly correspond to the real transmission time (for example due to unexpected changes in the radio link characteristics, etc.), the last transmission in the examples of FIG. 25 may be extended or shortened as required and/or further time fractions applying the first or the second working point may be added wherein it may be desirable to add time fractions using the more efficient working point, i.e. the second working point in this example.

Also, as mentioned above in context of FIG. 24, transmission pauses for switching may be introduced and the mobile device may take the switching time into account when determining the minimum required data rate.

The mobile device may minimize the number of links which are changed (for example from WiFi to LTE or similar) when switching working points since such a shutdown of one link of one technology and the establishment of another link according to another technology is typically requiring power. A variation between neighboring points on the convex envelope, as shown in FIG. 22 typically corresponds to a variation of only one link. This is a characteristic of convex optimization schemes which permit to jump from one working point to another working point on the convex envelope by modifying the mode of only one link of a working point for the jump.

This means that the two working points A and B use the same modes for almost all links, except for one. This also means that the switching mechanism and time concern only one link. It is also possible that two working points are used for which a multitude of links are different. However, this may not be desirably except if there are some additional constraints by the user or the operator (imposing corresponding policies).

As an example, let there be a certain target throughput (of e.g. 30 Mbit/s) and let two working points be identified, one just below the target throughput and one just above. The first operates simultaneously LTE with MAC mode QPSK, R=2/3 and WiFi with MAC mode 64QAM, R=2/5 (achieving 37.604 Mbit/s) and the second working point has an LTE link with MAC mode QPSK, R=2/3 and a WiFi link with MAC mode 16QAM, R=2/3 (achieving 28.375 Mbit/s). Note here that the LTE mode is the same, but the WiFi mode is different. So in order to achieve the target throughput while minimizing the power consumption, the mobile device configures itself for the first working points for 17.61% of the overall time. Afterwards, the mobile device switches to the corresponding second working point for the remaining total duration of the transmission (82.39% of the overall transmission time). But due to the difference in only one link between the working points, the LTE link would be operated on mode QPSK, R=2/3 for the whole time, while the switching would affect only the WiFi link: 64QAM, R=2/5 for 17.61% of the overall time and mode 16QAM, R=2/3 for 82.39% of the overall transmission time.

Figure 26:
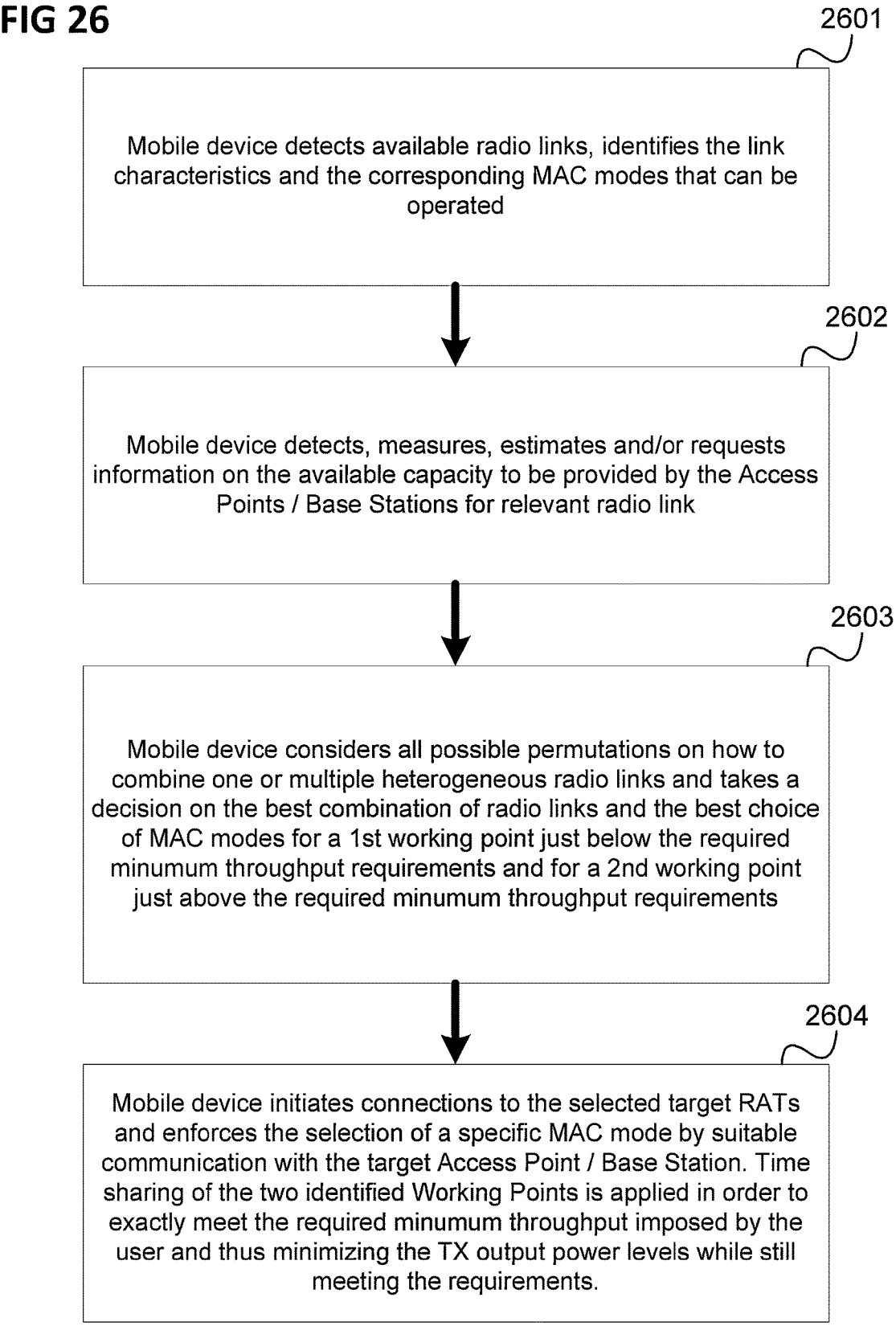
FIG. 26 shows a flow diagram.

In summary, for the time sharing approach, the mobile device 1002 for example carries out the flow as illustrated in FIG. 26.

FIG. 26 shows a flow diagram 2600.

In 2601, the mobile device 1002 detects available radio communication links, identifies the link characteristics and the corresponding MAC modes that can be operated for the links. For example, for a given path loss and other propagation constraints it identifies a maximum supported MAC mode, including a maximum possible constellation type (e.g., BPSK, QPSK, QAM, etc.) combined with the highest code rate possible (e.g., R=2/3, etc.)).

In 2602, the mobile device detects 1002, measures, estimates and/or requests information on the available capacity to be provided by the base stations 1001 for a relevant radio link, e.g. a radio link that may be considered. For LTE, for example, the expected number of resource blocks to be allocated to a specific user (i.e. mobile device) typically depends on the load of the base station.

In 2603, considers all possible combinations on how to combine one or multiple heterogeneous radio links 1003 and takes a decision on the best combination of radio links and the best choice of MAC modes for a first working point just below the required minimum throughput requirement and for a second working point just above the required minimum throughput requirement. Typically, the best solution for a given mobile device is to get as much spectrum as possible and to operate very low MAC modes such as BPSK, R=1/2. This is however in contrast to the realistic constraints that a base station only allocates a limited number of time/frequency/space resources to a single user.

In 2604, the mobile device 1002 initiates connections to the selected target RATs and enforces the selection of a specific MAC mode by suitable communication with the base station. The mobile device 1002 applies time sharing of the two identified working points in order to exactly meet the required minimum throughput imposed by the user and thus minimizing the transmission output power levels while still meeting the throughput requirement.

It should furthermore be noted that the selection of working points under time sharing may take the number of distinct radio links into account which need to be established for the various working points.

Figure 27:
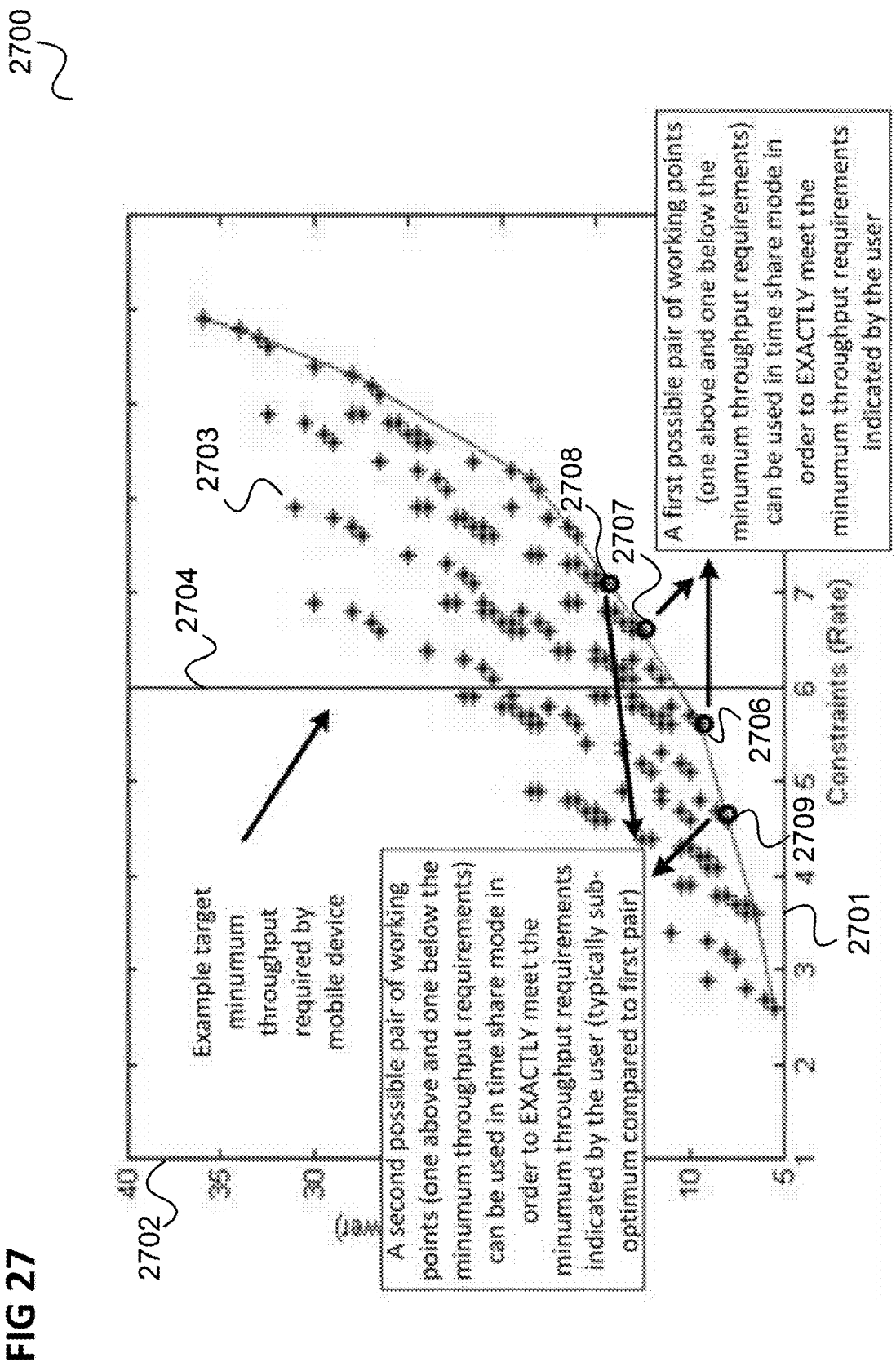
FIG. 27 shows a data rate-transmission power diagram illustrating two pairs of working points that may be used for time sharing.

FIG. 27 shows a data rate-transmission power diagram 2700 illustrating two pairs of working points that may be used for time sharing.

As in FIG. 3, data rate (i.e. throughput) of a communication configuration increases from left to right along a data rate axis 2701 and required transmission power (which can be seen as the cost of a communication configuration) increases from bottom to top along a power axis 2702 and a plurality of working points 2703 are shown in the diagram 2700. A line 2704 shows the target minimum throughput.

A first working point 2706 and a second working point 2707 form a first pair of working points and a third working point a third working point 2708 and a fourth working point 2709 form a second pair of working points.

The different pairs of time sharing working points may require a different number of distinct links. For example, assuming that a number of links are operated simultaneously for all working points, some pairs may require the change of only one RAT (i.e., one link is terminated while one new link is established) while some pairs may require the change of two RATs (i.e., two links are terminated while two new links are established) when switching between the working points of the respective pair. Typically, the change of RATs leads to an expense in power/energy which is not considered in the diagram 2700. Depending on the inherent expense in power/energy for a specific modem implementation, a mobile device may therefore decide to take a working point pair which requires the least (or smaller) number of link changes from one working point to the other, even if the overall power expense during the working period is higher compared to alternative working point pairs. It should be noted that different pairs of working points for time sharing do not necessarily need to consist of fully distinct pairs, i.e. it is possible to one pair includes one working point of another pair.

It should further be noted that time sharing can also be performed on a slot basis, i.e. assuming the air interface is included of fixed slots of duration Tslot. The integer number R1 of time slots using the first working point and the number R2 of time slots using the second working point can be calculated based on the cf parameter. This approach may be desirable for RATs where a MAC mode change is happening anyway at time slot boundaries.

Besides the application of time sharing to working points corresponding to combinations of radio links and MAC modes for the radio links, the mobile device 1002 may alternatively or in addition apply a time sharing approach to carrier aggregation scenarios.

In such a case, a first working point (i.e. communication configuration) for example corresponds to a low throughput configuration (applying no Carrier Aggregation or a low level of carrier aggregation) while a second working point corresponds to a high throughput configuration applying carrier aggregation either in the Downlink, Uplink or both. This is illustrated in FIG. 28.

Figure 28:
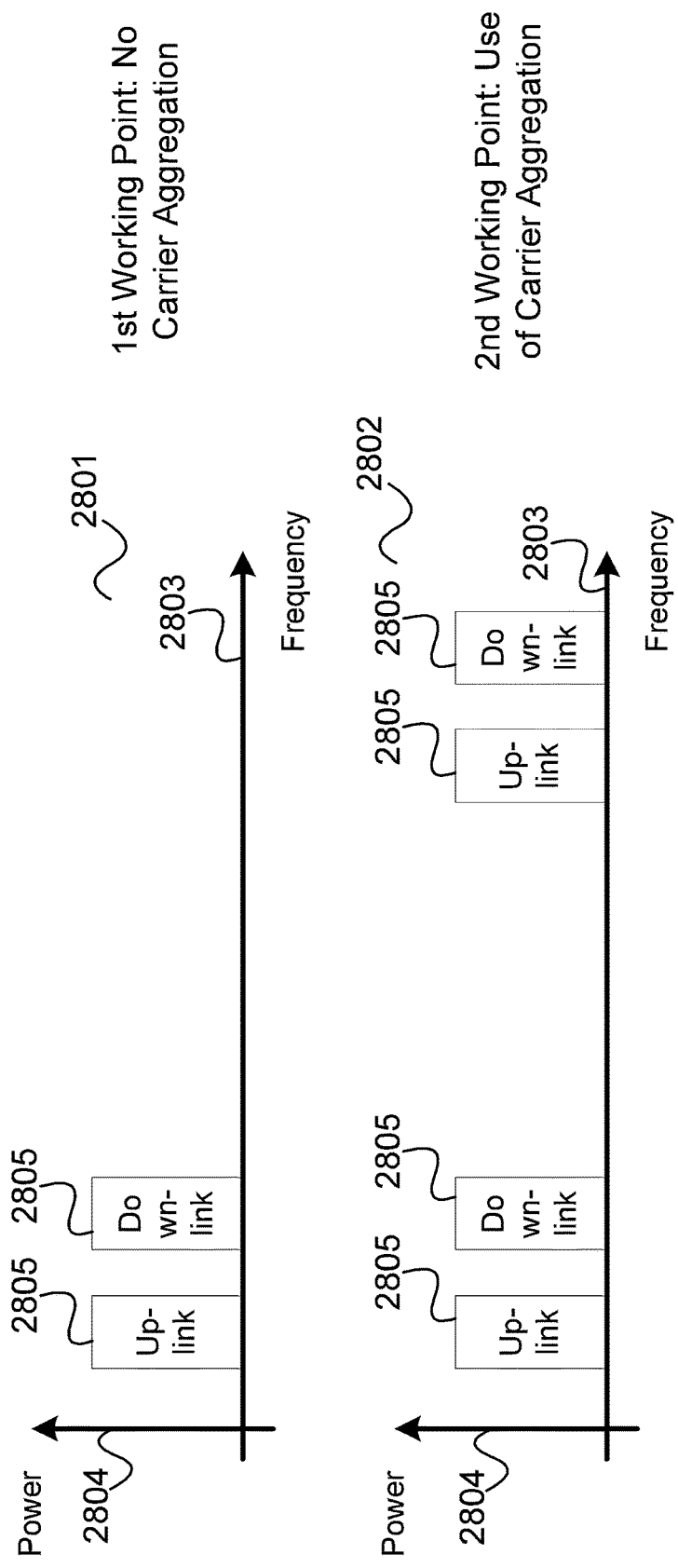
FIG. 28 shows a first frequency power diagram illustrating a working point without carrier aggregation and a second frequency power diagram illustrating a working point with carrier aggregation.

FIG. 28 shows a first frequency power diagram 2801 illustrating a working point without carrier aggregation and a second frequency power diagram 2802 illustrating a working point with carrier aggregation.

In the diagrams 2801, 2802 frequency increases from left to right according to frequency axis 2803 and power increases from bottom to top along a power axis 2804. The blocks 2805 with positive power indicate frequencies used for uplink or downlink, respectively, according to the working points.

Figure 29:
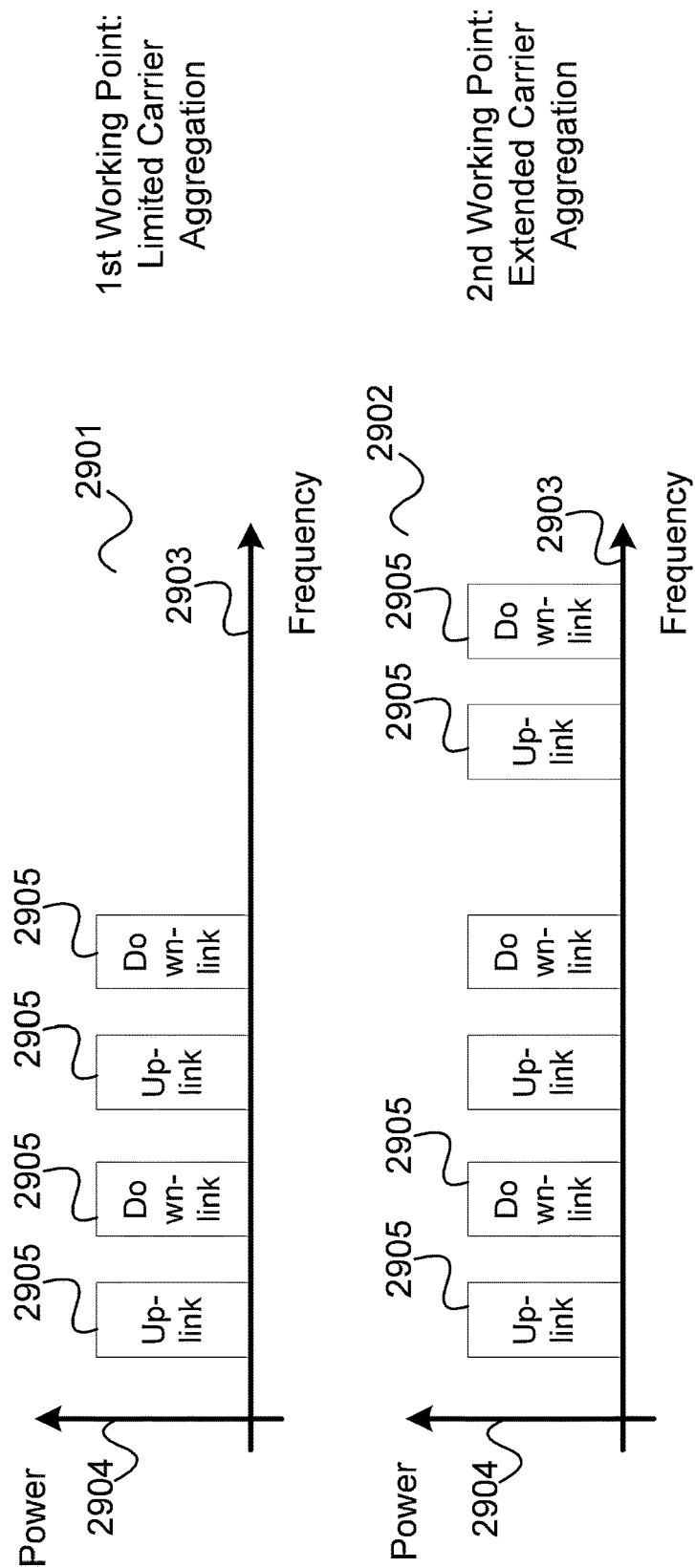
FIG. 29 shows a first frequency power diagram illustrating a working point with a lower level of carrier aggregation and a second frequency power diagram illustrating a working point with a higher level of carrier aggregation.

Alternatively, the first working point uses carrier aggregation and the second working point uses a higher level of carrier aggregation, i.e. adds further frequency channels as illustrated in FIG. 29.

FIG. 29 shows a first frequency power diagram 2901 illustrating a working point with a lower level of carrier aggregation and a second frequency power diagram 2902 illustrating a working point with a higher level of carrier aggregation.

As in FIG. 28, in the diagrams 2901, 2902 frequency increases from left to right according to frequency axis 2903 and power increases from bottom to top along a power axis 2904. The blocks 2905 with positive power indicate frequencies used for uplink or downlink, respectively, according to the working points.

Figure 30:
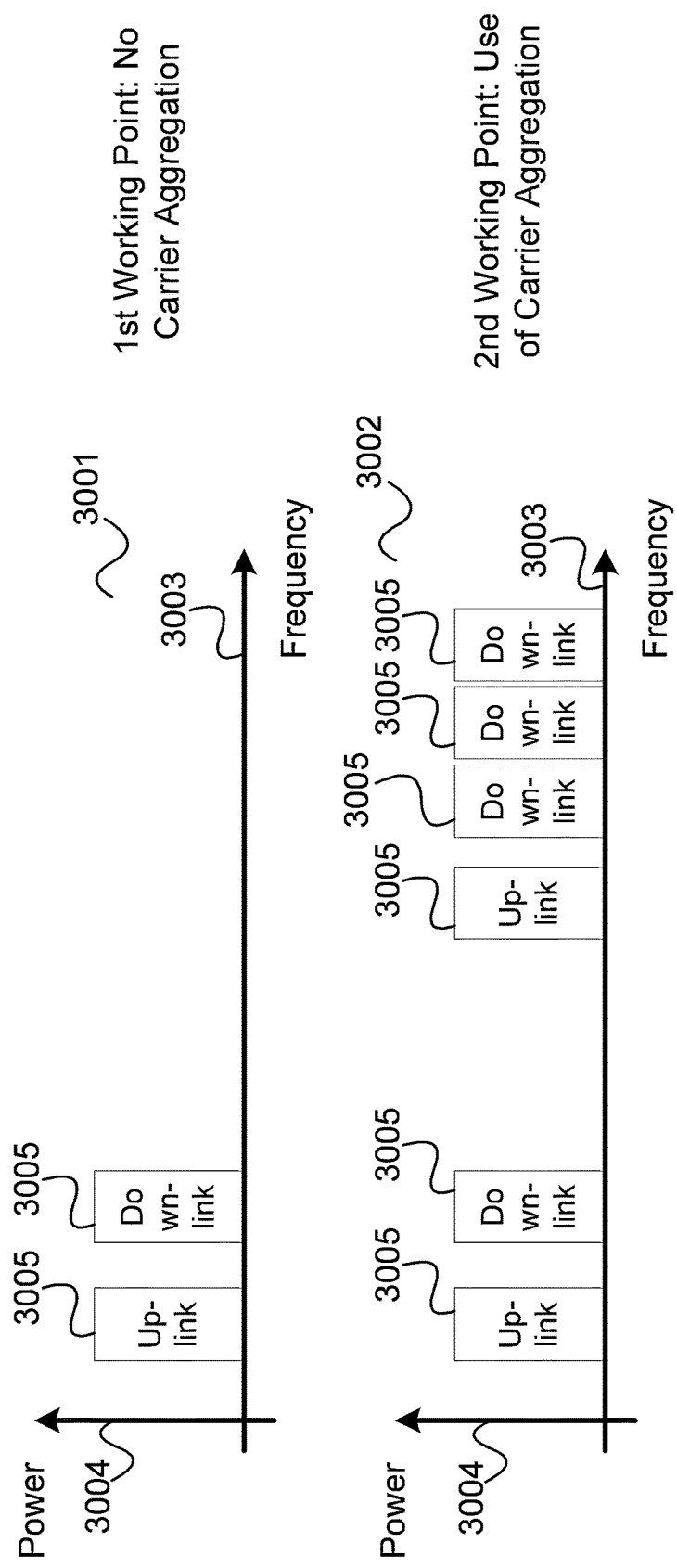
FIG. 30 shows a first frequency power diagram illustrating a working point with a lower level of carrier aggregation and a second frequency power diagram illustrating a working point with a higher level of carrier aggregation.

Further, the working points may have an asymmetric configuration for carrier aggregation, i.e. the number of aggregated uplink and downlink channels is different for the working points, as illustrated in FIG. 30.

FIG. 30 shows a first frequency power diagram 3001 illustrating a working point without carrier aggregation and a second frequency power diagram 3002 illustrating a working point with carrier aggregation.

As in FIG. 28, in the diagrams 3001, 3002 frequency increases from left to right according to frequency axis 3003 and power increases from bottom to top along a power axis 3004. The blocks 3005 with positive power indicate frequencies used for uplink or downlink, respectively, according to the working points.

Based on any of these working point configurations and assuming that the target throughput lies in between the final throughput provided by the first working point and the second working point (i.e. the throughput of the first working point is lower compared to the required final throughput and the throughput of the second working point is higher compared to the required final throughput), the time sharing approaches as described above with reference to FIGS. 24 and 25 can be used. Also, the same time sharing derivations and determination techniques for cf can be used.

It should be noted that the selection of MAC mode is typically in the responsibility base station (e.g. eNB). Accordingly, the selection procedures described may also be performed by the base station, or generally on the network side. Alternatively, the responsibility of MAC mode (or generally physical layer configuration) selection may be moved to the mobile device.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication terminal comprising:
   a circuit configured to determine, for each of a plurality of communication networks, a physical link configuration available for the communication terminal that provides a predetermined throughput to the communication terminal among a number of physical link configurations having one or more medium access control (MAC) modes that are available for the communication terminal; and
   a controller circuit configured
      to check, for each of the plurality of communication networks, whether a throughput criterion is met when the communication terminal communicates with the communication network with a physical link configuration having a MAC mode that provides less than the predetermined throughput among the number of physical link configurations that are available for the communication terminal;
      select, for at least one of the communication networks, a communication link to the communication network with a physical link configuration having a MAC mode having less than the predetermined throughput instead of the physical link configuration having the MAC mode with the predetermined throughput; and
      to establish a communication link to the selected communication link to one or more of the communication networks based on the result of the checking.

2. The communication terminal of claim 1, wherein the controller is configured to establish, for at least one of the communication networks, a communication link to the communication network with a physical link configuration that is less than a maximum throughput among the number of physical link configurations that is available for the communication terminal if the communication terminal meets the throughput criterion when the communication terminal communicates with the communication network with the physical link configuration.

3. The communication terminal of claim 1, wherein the controller is configured to select one or more communication links to one or more of the communication networks and, for each of the one or more communication links, a physical link configuration, based on the result of the checking and is configured to establish the selected one or more communication links with the selected physical link configurations.

4. The communication terminal of claim 3, wherein the controller is configured to request, for each of the one or more selected communication links, establishment of the communication link with the selected physical link configuration from the respective communication network.

5. The communication terminal of claim 3, wherein the controller is configured to select the one or more communication links based on a criterion for reducing the required transmission power operating the one or more communication links.

6. The communication terminal of claim 3, wherein the controller is configured to select the one or more communication links based on a criterion for maximizing the frequency spectrum provided by the one or more communication links.

7. The communication terminal of claim 3, wherein the controller is configured to select the one or more communication links based on a criterion for maximizing the transmission power efficiency provided by the one or more communication links.

8. The communication terminal of claim 1, wherein the controller is configured to search, for the communication networks and, for each of the plurality of communication networks, a set of available physical layer configurations for a communication link to the communication network, a communication configuration which includes a set of communication links and, for each communication link, a physical link configuration.

9. A method for determining communication links for a communication comprising:
    searching, for a set of communication links and, for each communication link, a set of available physical layer configurations having one or more medium access control (MAC) modes, for a communication configuration which includes one or more communication links and, for each of the one or more communication links, an available physical link configuration based on a search criterion; wherein each communication link of the set of communication links pertains to the same radio access technology;
    determining which one of the communication links having a MAC mode has a predetermined throughput of the set of communication links;
    selecting a communication link having a physical link configuration having a MAC mode less than the predetermined throughput instead of the physical link configuration having a MAC mode with a predetermined throughput; and
    establishing a communication according to the selected communication configuration.

10. The method of claim 9, performed by a communication terminal.

11. The method of claim 10, wherein the communication terminal is configured to request one or more communication networks to set up communication links according to the communication configuration found.

12. The method of claim 9, further comprising:
    eliminating, for a communication configuration found in the search and for a communication link included in the communication configuration found in the search the physical layer configuration of the communication link in the communication configuration found in the search from the set of available physical layer configurations of the communication link of to form an updated set of physical layer configurations for the communication link; and
    repeating the search for a communication configuration based on the updated set of available physical layer configurations for the communication link.

13. The method of claim 9, wherein the searching comprises searching for a communication configuration which is optimal according to the search criterion.

14. The method of claim 13, wherein the search criterion includes the throughput of the communication configuration being above a predetermined minimum throughput.

15. A communication terminal comprising:
    a transceiver configured to perform a communication switching between a first communication configuration having a first medium access control (MAC) mode and a second communication configuration having a second MAC mode such that the average throughput of the communication is equal to or above a predetermined throughput criterion; and wherein the MAC mode of the first communication configuration meets the throughput criterion and the MAC mode of the second communication configuration does not meet the predetermined throughput criterion.

16. The communication terminal of claim 15, comprising a determiner configured to determine the throughput of a first communication configuration and the throughput of a second communication configuration and a controller configured to control switching of communication between the first communication configuration and the second communication configuration based on the throughput of the first communication configuration and the throughput of the second communication configuration.

17. The communication terminal of claim 15, wherein the controller is configured to determine the length of the periods of communication using the first communication configuration and the length of the periods of communication using the second communication configuration based on the throughput criterion, based on the first throughput and based on the second throughput.

18. The communication terminal of claim 15, comprising a controller configured to determine a communication configuration with the first throughput and a communication configuration with the second throughput.

* * * * *